(12) United States Patent
Oike et al.

(10) Patent No.: US 7,556,438 B2
(45) Date of Patent: Jul. 7, 2009

(54) OPTICAL CONNECTOR AND OPTICAL FIBER CONNECTING SYSTEM

(75) Inventors: Tomayasu Oike, Tokyo (JP); Takaya Yamauchi, Tokyo (JP); Akihiko Yazaki, Tokyo (JP); Tsunetaka Ema, Tokyo (JP); Kenichi Nakazawa, Tokyo (JP); Yasuhiko Hoshino, Tokyo (JP)

(73) Assignees: 3M Innovative Properties Company, St. Paul, MN (US); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 11/572,112

(22) PCT Filed: Jun. 23, 2005

(86) PCT No.: PCT/US2005/022400

§ 371 (c)(1),
(2), (4) Date: May 22, 2008

(87) PCT Pub. No.: WO2006/019515

PCT Pub. Date: Feb. 23, 2006

(65) Prior Publication Data

US 2008/0247710 A1   Oct. 9, 2008

(30) Foreign Application Priority Data

Jul. 16, 2004   (JP) .............................. 2004-210357

(51) Int. Cl.
G02B 6/36 (2006.01)
G02B 6/38 (2006.01)

(52) U.S. Cl. ............................. 385/78; 385/60; 385/65; 385/72; 385/83; 385/95

(58) Field of Classification Search ........................ None
See application file for complete search history.

(56) References Cited

U.S. PATENT DOCUMENTS 4,611,887 A   9/1986   Glover et al.

(Continued)

FOREIGN PATENT DOCUMENTS

EP   0 486 064 A2   11/1990

(Continued)

OTHER PUBLICATIONS

Reith, L.A.; "Issues Relating to the Performance of Optical Connectors and Splices," *Passive Fiber Optic Components and Their Reliability* (Apr. 6-8, 1993); SPIE vol. 1973; Berlin, DE; Bellingham, WA, US; pp. 294-305.

*Primary Examiner*—Michelle R Connelly Cushwa
(74) *Attorney, Agent, or Firm*—Gregg H. Rosenblatt

(57) ABSTRACT

An angle type optical connector enables a splicing operation of an optical fiber cable accurately and stably without requiring skilled labor and having a superior on-site installation property. An optical connector is provided with a splicing section for securely supporting an incorporated optical fiber securely supported at a ferrule and an optical fiber of an outside optical fiber cable in an end-abutting condition. The body of the optical connector is provided with a cable holding member able to hold an optical fiber cable. The cable holding member can be set at a temporary position where it makes an optical fiber of the optical fiber cable abut against the incorporated optical fiber at the splicing section in the state holding the optical fiber cable and bends a covered optical fiber of the optical fiber cable between the splicing section and the cable holding member by a pressing force in the lengthwise direction.

6 Claims, 21 Drawing Sheets

U.S. PATENT DOCUMENTS

| | | |
|---|---|---|
| 5,042,902 A | 8/1991 | Huebscher et al. |
| 5,082,344 A | 1/1992 | Mulholland et al. |
| 5,129,023 A | 7/1992 | Anderson et al. |
| 5,159,653 A | 10/1992 | Carpenter et al. |
| 5,189,717 A | 2/1993 | Larson et al. |
| 5,347,603 A | 9/1994 | Belenkiy et al. |
| 5,363,460 A | 11/1994 | Marazzi et al. |
| 5,390,272 A | 2/1995 | Repta et al. |
| 5,394,496 A | 2/1995 | Caldwell et al. |
| 5,461,690 A | 10/1995 | Lampert |
| 5,542,015 A | 7/1996 | Hultermans |
| 5,619,610 A | 4/1997 | King et al. |
| 5,682,450 A | 10/1997 | Patterson et al. |
| 5,694,506 A | 12/1997 | Kobayashi et al. |
| 5,710,851 A | 1/1998 | Walter et al. |
| 5,732,174 A | 3/1998 | Carpenter et al. |
| 5,734,770 A | 3/1998 | Carpenter et al. |
| 5,761,360 A | 6/1998 | Grois et al. |
| 5,812,718 A | 9/1998 | Carpenter et al. |
| 5,940,561 A | 8/1999 | Dean et al. |
| 5,963,699 A | 10/1999 | Tanaka et al. |
| 5,993,070 A | 11/1999 | Tamekuni et al. |
| 6,193,421 B1 | 2/2001 | Tamekuni et al. |
| 6,224,268 B1 | 5/2001 | Manning et al. |
| 6,302,592 B1 | 10/2001 | Züllig |
| 6,457,878 B2 | 10/2002 | Edwards et al. |
| 6,595,696 B1 | 7/2003 | Zellak |
| 6,623,173 B1 | 9/2003 | Grois et al. |
| 7,140,787 B2 | 11/2006 | Yamauchi et al. |
| 7,270,487 B2 | 9/2007 | Billman et al. |
| 7,280,733 B2 | 10/2007 | Larson et al. |
| 7,331,718 B2 * | 2/2008 | Yazaki et al. .................. 385/78 |
| 7,454,117 B2 | 11/2008 | Carpenter et al. |
| 2001/0043777 A1 | 11/2001 | Lu |
| 2001/0048790 A1 | 12/2001 | Burkholder et al. |
| 2003/0108303 A1 | 6/2003 | Asada |
| 2003/0147597 A1 | 8/2003 | Duran |
| 2004/0252949 A1 | 12/2004 | Verhagen |
| 2005/0063662 A1 | 3/2005 | Carpenter et al. |
| 2006/0165352 A1 | 7/2006 | Caveney et al. |
| 2007/0133926 A1 | 6/2007 | Semmler et al. |
| 2007/0147741 A1 | 6/2007 | Meek et al. |
| 2007/0172179 A1 | 7/2007 | Billman et al. |
| 2008/0304795 A1 * | 12/2008 | Oike et al. .................... 385/81 |

FOREIGN PATENT DOCUMENTS

| | | |
|---|---|---|
| EP | 0 546 936 A1 | 6/1993 |
| EP | 0 742 456 A1 | 11/1996 |
| EP | 1 054 278 A2 | 11/2000 |
| EP | 1 072 914 A | 1/2001 |
| EP | 1 162 486 A2 | 12/2001 |
| FR | 2 464 490 | 3/1981 |
| JP | 58-152215 | 9/1983 |
| JP | UM 3022015 | 12/1995 |
| JP | 10-111434 | 4/1998 |
| JP | 2000-235132 | 8/2000 |
| JP | 2001-83385 | 3/2001 |
| JP | 2002-23006 | 1/2002 |
| JP | 2003-161863 | 6/2003 |
| JP | 2003-177275 | 6/2003 |
| JP | 3445479 | 6/2003 |
| JP | 2005-265973 | 9/2005 |
| JP | 2005-265974 | 9/2005 |
| JP | 2005-265975 | 9/2005 |
| JP | 2005-266086 | 9/2005 |
| JP | 2005-266087 | 9/2005 |
| JP | 2005-266088 | 9/2005 |
| WO | WO 93/21547 | 10/1993 |
| WO | WO 95/07794 | 3/1995 |
| WO | WO 04/001472 A1 | 12/2003 |

* cited by examiner

OPTICAL CONNECTOR AND OPTICAL FIBER CONNECTING SYSTEM

This application is a national stage filing under 35 U.S.C. 371 of PCT/US2005/022400 filed Jun. 23, 2005, which claims priority to Japanese Application No. 2004-210357, filed Jul. 16, 2004, the disclosure of which is incorporated by reference in its entirety herein.

TECHNICAL FIELD

The present invention relates to optical fiber connecting technology, and more particularly to an optical connector including a ferrule and a splicing section, both arranged in a body; and an optical fiber connecting system composed of such an optical connector and another optical connector combined together.

BACKGROUND

In optical fiber connecting technology, there is known an optical connector provided with, at a common connector body, a ferrule for securely supporting an optical fiber having a predetermined length (in the present specification, called an "incorporated optical fiber") and a splicing section near the ferrule and able to operate for gripping under pressure a part of the incorporated optical fiber projecting out from the ferrule and an optical fiber of an optical fiber cable introduced from the outside (for example, see Japanese Patent No. 3445479). This type of optical connector with a splicing section is being used often as being able to easily form a connection part of an optical transmission line able to be freely connected and separated in particular at the installation site of the optical transmission line.

An optical connector with a splicing section is generally formed with the front end face of the incorporated optical fiber secured in the fiber holding channel of the ferrule made smooth by polishing the abutting end face of the ferrule (that is, the face which will abut against the ferrule of the other optical connector) in advance in the connector production plant or other facility and with the rear end face of the projecting portion of the incorporated optical fiber projecting out from the other end of the ferrule made smooth by slicing using a cutting tool. Further, the splicing section is provided with a fiber securing member provided with a straight securing groove able to be arranged coaxially with respect to a fiber holding channel of the ferrule so as to be able to operate between a closed position securely gripping the projecting portion of the incorporated optical fiber in the securing groove and an open position releasing that projecting portion. When the optical connector is not being used, the projecting portion of the incorporated optical fiber projecting from the ferrule is received in the securing groove of the fiber securing member of the splicing section at the open position or closed position and arranged at a predetermined centering position.

Said optical connector can be attached to the terminal end of an optical fiber cable with a high precision and low loss by performing the required cable terminating operation and splicing operation on the optical fiber cable to be attached at the installation site of an optical transmission line. Specifically, as the cable terminating operation, the sheath is stripped off a desired length of the terminal end of the optical fiber cable to expose the covered optical fiber, the covering is stripped off a desired length of the terminal end of the covered optical fiber to expose the optical fiber, and the exposed optical fiber is sliced to a predetermined length by a cutting tool. Further, in the splicing operation, the fiber securing member of the splicing section of the optical connector is set to the open position, the exposed optical fiber of the optical fiber cable is inserted in the securing groove of the fiber securing member, the sliced end face of the cable optical fiber is made to abut against the rear end face of the projecting portion of the incorporated optical fiber in the securing groove, and in that state the fiber securing member is moved to the closed position. Due to this, the incorporated optical fiber and the cable optical fiber are securely supported in a concentric end-abutting condition, whereby the optical connector is attached to the optical fiber cable.

Here, at the time of the splicing operation, before moving the fiber securing member of the splicing section from the open position to the closed position, it is necessary to make the incorporated optical fiber and the optical fiber of the optical fiber cable accurately abut against each other at their end faces. This accurate abutting condition is secured by bringing the incorporated optical fiber and the cable optical fiber into contact at their end faces in the securing groove of the fiber securing member, then applying a suitable pressing force in the lengthwise direction toward the fiber securing member to the covered optical fiber of the optical fiber cable. At this time, the covered optical fiber is bent somewhat at the outside of the fiber securing member due to the pressing force in the lengthwise direction. Further, a special assembly tool has been proposed in the past which can hold the covered optical fiber of the optical fiber cable in the bent state so as to maintain the pressed abutting state of the end faces of the optical fibers while moving the fiber securing member from the open position to the closed position until finishing the splicing operation (for example, see Japanese Unexamined Patent Publication (Kokai) No. 2002-23006).

The assembly tool described in JP Kokai 2002-23006 is provided with a connector mount for mounting the body of an optical connector, an operating part for operating the fiber securing member of the optical connector, and a fiber holding part for holding the covered optical fiber of the optical fiber cable at a predetermined position with respect to the optical connector—all suitably arranged on a single base. The fiber holding part is provided with a gripping member comprised of a sponge or other elastic material and can grip the covered optical fiber by a suitable elastic force in a slit provided in the gripping member. At the time of a splicing operation of the optical connector, the optical fiber exposed at the terminal end of the optical fiber cable is inserted into the fiber securing member of the optical connector mounted at the connector mount, then the covered optical fiber is inserted into the gripping member of the fiber holding part while applying a suitable pressing force in the lengthwise direction toward the optical connector to the covered optical fiber. In this state, the covered optical fiber is suitably bent between the optical connector and the gripping member. Due to this, it is confirmed that the incorporated optical fiber and the optical fiber of the optical fiber cable are made to accurately abut against each other in the securing groove of the fiber securing member (normally not visible). Therefore, by moving the fiber securing member from the open position to the closed position while maintaining the bent state of the covered optical fiber, the two optical fibers can be made to connected accurately abutting against each other.

Note that in the present specification, the "covered optical fiber" means a member including a soft covering on the outer surface of the cladding of an optical fiber, while the "optical fiber" means a member stripped of this covering. Further, an "optical fiber cable" means a member including one or more covered optical fibers accommodated together with a tension member in a sheath (generally a plastic sheath), and includes an "optical fiber cord" as well in its broad definition.

Incidentally, in an optical transmission line, an optical fiber connecting system using optical connectors is required to be able to maintain a suitable optical connection condition against any external force such as tension applied to the optical fiber cable. In particular, to prevent the spliced portion of the optical fiber cable and an optical connector from damage due to tension or other external force, there is known an optical connector comprised of a connector body provided with a cable holding part able to securely hold the optical fiber cable (for example, see Japanese Utility Model Registration No. 3022015).

The optical connector described in JP UM 3022015 has, as a cable holding part, a securing member having a U-groove portion able to be arranged in a fiber passage provided in the connector body and movably attached to the connector body. At the time of a splicing operation, the securing member is set at a position on the connector body opening the fiber passage, the end portion of the optical fiber cable is inserted in the fiber passage, then the securing member is pushed into the fiber passage to insert the sheath of the optical fiber cable into the U-groove portion under pressure. Due to this, the optical fiber cable is securely held at the connector body. At this time, a special tool having a cable receiving part is used, the cable receiving part is pushed into the fiber passage of the connector body from the opposite side to the securing member, the optical fiber cable is gripped between the securing member and the cable receiving part, and the optical fiber cable is inserted into the U-groove portion of the securing member.

Here, an optical fiber cable, comprised of one or more covered optical fiber and a pair of tension members (for example, steel wires, FRP (fiber reinforced plastic) cords, etc.) arranged at both lateral sides of the covered optical fiber, which are accommodated in a plastic sheath with substantially no clearance therebetween, is known as a drop optical fiber for an aerial access line (for example, see Japanese Kokai No. 2001-83385). The conventional drop optical cable has a pair of channels extending in the lengthwise direction at opposite positions on the outer surface of the sheath, and, at the time of the cable terminating operation of the drop optical cable, it is possible to tear apart the sheath in the lengthwise direction along the pair of channels so as to easily expose the covered optical fiber.

Conventionally, when attaching an optical connector to the terminal end of such a drop optical cable, the pair of tension members of the terminated drop optical cable are mechanically secured to the connector body by a securing member provided at the optical connector (for example, see Japanese Kokai No. 2003-177275). The optical connector described in JP 2003-177275 is provided at the end at the fiber introduction side of the connector body with a securing member having a passage for the covered optical fiber and a friction area at the outer surface positioned around that passage. The drop optical cable is securely connected to the body of the optical connector by inserting the covered optical fiber into the passage of the securing member to secure it to the ferrule, then arranging the pair of torn apart sheath portions containing the tension members to follow along the friction area at the outer surface of the securing member and tightening a metal fitting from the outside of the two sheath portions to press against the friction area under pressure.

Note that in optical fiber connecting systems using optical connectors, there is known a configuration using a pair of optical connectors having engaging parts of different shapes complementarily engageable with each other at their bodies (so-called "plug" and "socket"). For example, in access work for extending and laying optical fiber cables from a public optical fiber network to individual houses, generally socket-type optical connectors attached to the terminal ends of optical fiber cables are provided at switchboxes provided at desired positions in the houses in accordance with household electrical wiring work. Further, the optical terminals used in houses and optical connectors in the switchboxes are configured so as to be detachably attached using optical fiber cords provided with plug-type optical connectors at their front ends.

In such an application, when installing an optical connector in a limited space such as a switchbox, it is sometimes necessary to lay the optical fiber cable extended from the rear end of the optical connector bent by a large amount near the optical connector. At this time, from the viewpoint of suppressing optical loss, there is proposed an optical connector provided with a cable holding part for holding the optical fiber cable in a state bent to a predetermined radius so as to prevent the covered optical fiber from being bent by a radius smaller than the prescribed smallest bending radius (in the present specification, called an "angle type optical connector") (for example, see Japanese Kokai No. 2003-161863). As opposed to this, an optical connector without spatial restrictions such as a plug-type optical connector to be attached to an optical fiber cord is provided with a cable holding part for holding the optical fiber cable straight with respect to the ferrule, so is called a "straight type optical connector" in the present specification.

SUMMARY

To address the objects described herein, an embodiment of the invention described provides an optical connector comprising a body; a ferrule provided in the body; an incorporated optical fiber with a predetermined length, securely supported on the ferrule; and a splicing section provided in the body near the ferrule and able to operate so as to securely support the incorporated optical fiber projecting out from the ferrule and an optical fiber of an optical fiber cable introduced from outside of the body in an end-abutting condition, characterized in that the optical connector further comprises a cable holding member provided in the body at a location opposite to the ferrule with the splicing section disposed therebetween, the cable holding member being able to hold an optical fiber cable; and in that the cable holding member is movable with respect to the body about an axis extending in a direction intersecting an extending direction of the incorporated optical fiber; the cable holding member being able to be set, in a state holding the optical fiber cable, at a temporary position where the cable holding member makes the optical fiber of the optical fiber cable abut against the incorporated optical fiber in the splicing section and bends a covered optical fiber of the optical fiber cable between the splicing section and the cable holding member under a lengthwise pressing force.

In another aspect, an optical connector further comprises an anchoring structure for temporarily anchoring the cable holding member at the temporary position on the body.

In another aspect, the cable holding member of an optical connector is able to be set at a finished position where, after the splicing section securely supports the incorporated optical fiber and the optical fiber of the optical fiber cable in the end-abutting condition, the lengthwise pressing force applied to the covered optical fiber of the optical fiber cable is released.

In another aspect, an optical connector further comprises an anchoring structure for anchoring the cable holding member at the finished position on the body.

In another aspect, the cable holding member of an optical connector is provided with a straight receptive groove for receiving the optical fiber cable, and is movable between the temporary position where the receptive groove extends in a direction substantially parallel to the extending direction of the incorporated optical fiber and the finished position where the receptive groove extends in a direction intersecting the extending direction of the incorporated optical fiber; and wherein the covered optical fiber of the optical fiber cable is bent between the splicing section and the receptive groove by a bending radius equal to or larger than a predetermined smallest bending radius when the cable holding member is located at the finished position.

In yet another aspect, an optical fiber connecting system comprises a first optical connector described above and a second optical connector having a second ferrule to be concentrically abutted against the ferrule of the first optical connector; the first and second optical connectors being detachably combined with each other.

As explained above, in a conventional optical connector with a splicing section, at the time of a splicing operation of an optical fiber cable, a special tool is used to maintain the covered optical fiber in a suitable bent state under a pressing force in the lengthwise direction at the outside of the connector while moving the fiber securing member of the splicing section from the open position to the closed position so as to connect the incorporated optical fiber and the optical fiber of the optical fiber cable in an accurately abutting condition. Such a tool, as described in JP Kokai 2002-23006, is provided at least with a connector mount, an operating part, and a fiber holding part, so tends to become larger in outer dimensions than the optical connector. Due to this, the work efficiency of the splicing operation on the installation site of an optical transmission line sometimes deteriorates. Further, when using a tool, at the time of bending the covered optical fiber at the outside of the optical connector and inserting it into the gripping member of the fiber holding part, careful attention and skilled labor are required so as to prevent application of more than the necessary tension to the covered optical fiber and to prevent deviation in the position of the optical fiber inserted into the splicing section of the optical connector.

On the other hand, looking at the cable holding part provided at a conventional optical connector, in the configuration described in JP UM 3022015, a special tool is used to insert the sheath of the optical fiber cable under pressure into a U-groove portion of the securing member. At this time, the position of the optical fiber cable inserted at the U-groove portion at the connector body is determined by the relative positional relationship of the tool and the connector body, but this depends on the experienced judgment of the worker. Therefore, when attaching an optical connector to an optical fiber cable of a different sheath outside diameter, it becomes difficult to arrange the covered optical fiber accurately concentrically with the ferrule in the optical connector and as a result the optical loss is liable to increase.

Further, as described in JP Kokai 2003-177275, conventional optical connectors have been configured to use tightening of metal fittings for the cable holding parts for aerial drop optical cables, so the number of parts of the optical connectors and the number of steps of the assembly work tended to increase. Note that, in an optical connector with a splicing section, no cable holding part for directly holding an optical fiber cable together with the sheath thereof, such as an aerial drop optical cable, in which a covered optical fiber and a tension member are accommodated in a plastic sheath with substantially no clearance therebetween, has been realized. This appears to be caused by a fact that, while it is possible for a general optical fiber cable, accommodating a covered optical fiber and a tension member in a sheath with a clearance therebetween, to absorb the bending of the covered optical fiber, which may generate due to the abutment of a cable-side optical fiber to an incorporated optical fiber in the splicing section, at the interior of the sheath (in other words, the sheath may not be bent in itself), it is difficult for an optical fiber cable such as the aerial drop optical cable to do so. Therefore, in the case where the optical connector having the splicing section is attached to the optical fiber cable such as the aerial drop optical cable, it has been necessary to use the special tool as described above.

Thus, an object of the present invention is to provide an angle-type optical connector having a ferrule and a splicing section which enables a splicing operation of an optical fiber cable to be performed accurately and stably without requiring skilled labor and which has a superior on-site installation property.

Another object of the present invention is to provide an angle-type optical connector having a ferrule and a splicing section, which has a cable holding part able to directly hold an optical cable together with the sheath thereof, such as an aerial drop optical cable, in which a covered optical fiber and a tension member are accommodated in a plastic sheath with substantially no clearance therebetween.

Still another object of the present invention is to provide an optical fiber connecting system comprised of a pair of optical connectors combined together which enables a splicing operation of an optical fiber cable to an optical connector to be performed accurately and stably and which improves the on-site installation property.

According to the embodiments described above, at the time of the splicing operation of an optical fiber cable, by setting the cable holding member at the temporary position, it is possible to maintain the covered optical fiber of the optical fiber cable in a suitably bent state under a pressing force in the lengthwise direction inside the optical connector (that is, between the splicing section and the cable holding member). Further, by moving the splicing section in this state, it is possible to connect the incorporated optical fiber and the optical fiber of the optical fiber cable in the state with the two end faces accurately abutted together. Therefore, there is no longer a need for using a conventional assembly tool having a fiber holding part. As a result, the work efficiency of the splicing operation at the installation site of the optical transmission line is remarkably improved. Further, it is possible to bend the covered optical fiber without directly touching the covered optical fiber by just moving the cable holding member to the temporary position, so the danger of more than the necessary tension being applied to the covered optical fiber or the position of the optical fiber inserted into the splicing section deviating is eliminated. Therefore, the splicing operation of the optical fiber cable can be performed accurately and stably without requiring skilled labor and a superior on-site installation property can be realized. The optical connector having this structure is capable of directly holding an optical cable together with the sheath thereof, such as an aerial drop optical cable, in which a covered optical fiber and a tension member are accommodated in a plastic sheath with substantially no clearance therebetween.

According to the embodiments described above, in a splicing operation of an optical fiber cable, after arranging the cable holding member at the temporary position once, even if letting go of the cable holding member, the covered optical fiber can be reliably maintained in the suitably bent condition, so the work of moving the splicing section becomes much easier.

According to the embodiments described above, after finishing the splicing operation at the splicing section, the cable holding member is moved to the finished position to substantially release the pressing force in the lengthwise direction applied to the covered optical fiber of the optical fiber cable, so it is possible to sufficiently reduce the optical loss at the portion of the covered optical fiber of the optical fiber cable and possible to increase the lifetime at that portion of the covered optical fiber.

According to the embodiments described above, after finishing the splicing operation of the optical fiber cable and arranging the cable holding member at the finished position, even if tension or other external force is applied to the optical fiber cable, the cable holding member is mechanically stopped stably at the finished position, so the danger of unintentional tension being applied to the covered optical fiber is eliminated.

According to the embodiments described above, since a one-piece cable holding member is used to receive the sheath of the optical fiber cable in a receptive groove so as to hold the optical fiber cable, a very simple cable holding structure is realized, in comparison with the prior art such as tightening a metal fitting, and it is thus possible to reduce the number of parts and number of assembly steps of the optical connector. Also, when the cable holding member is at the finished position, the covered optical fiber of the optical fiber cable is bent by a bending radius of at least the predetermined smallest bending radius in the state with the pressing force in the lengthwise direction released, so optical loss in the covered optical fiber is suppressed and the external dimensions of the optical connector as seen in the direction of extension of the incorporated optical fiber at the time of completion of connection can be effectively slashed.

According to the embodiments described above, in an optical fiber connecting system comprised of a pair of optical connectors combined together, it becomes possible to accurately and stably perform a splicing operation of an optical fiber cable to the optical connectors and the on-site installation property is improved.

DETAILED DESCRIPTION

The present invention provides optical fiber connecting technology which can be applied extremely well to applications where a superior on-site installation property and safety are required such as detachable optical splices at optical transmission lines arranged indoors.

Below, embodiments of the present invention will be explained in detail with reference to the attached drawings. Throughout the figures, corresponding components are assigned common reference notations.

Figure 1:
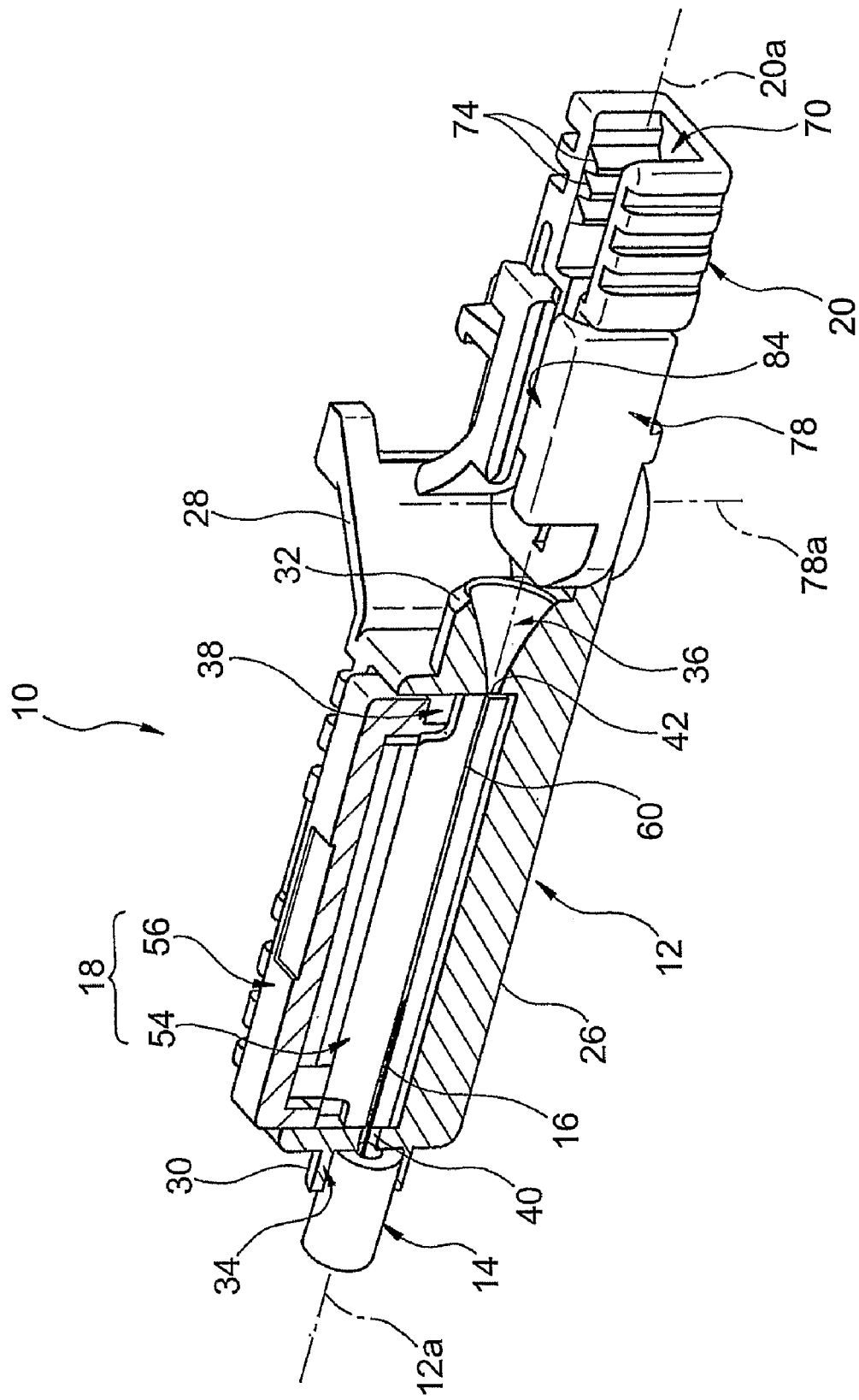
FIG. 1 is a cross-sectional perspective view of an optical connector according to an embodiment of the present invention.
Figure 2:
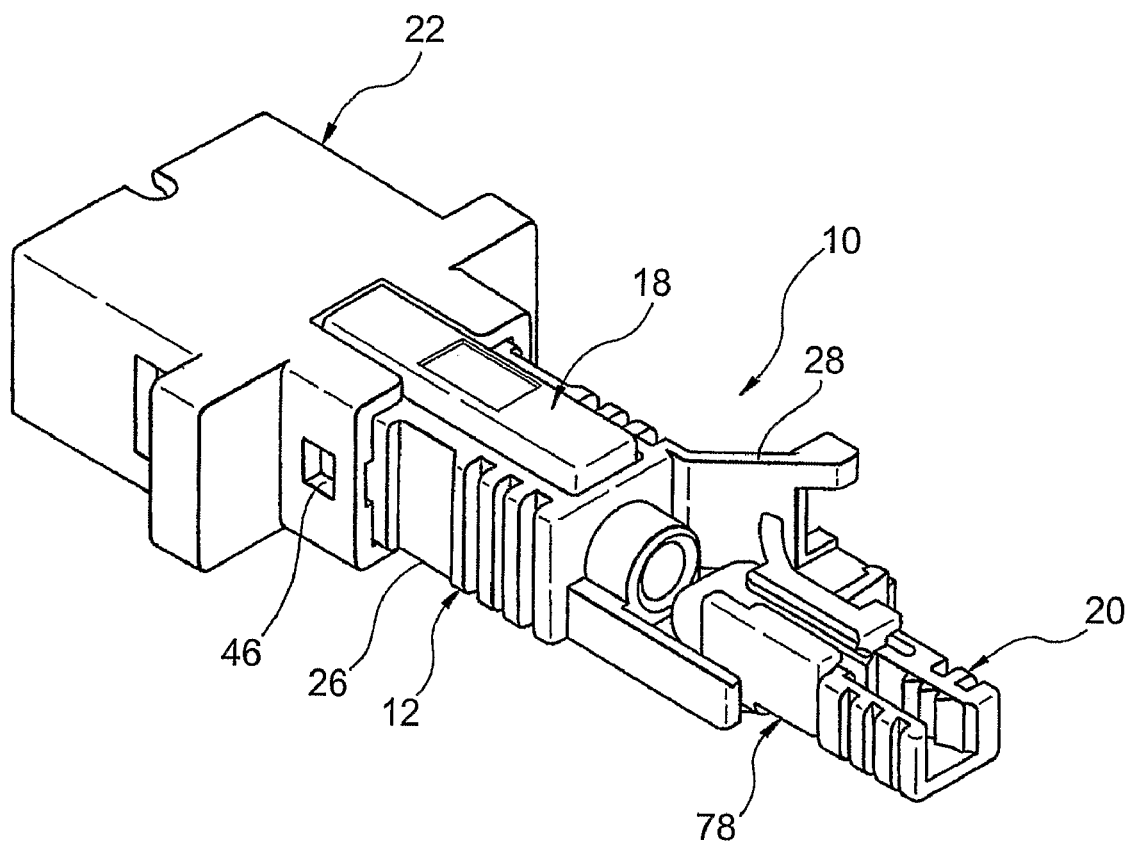
FIG. 2 is an overall perspective view of the optical connector of FIG. 1 showing the state with an adapter attached.
Figure 3:
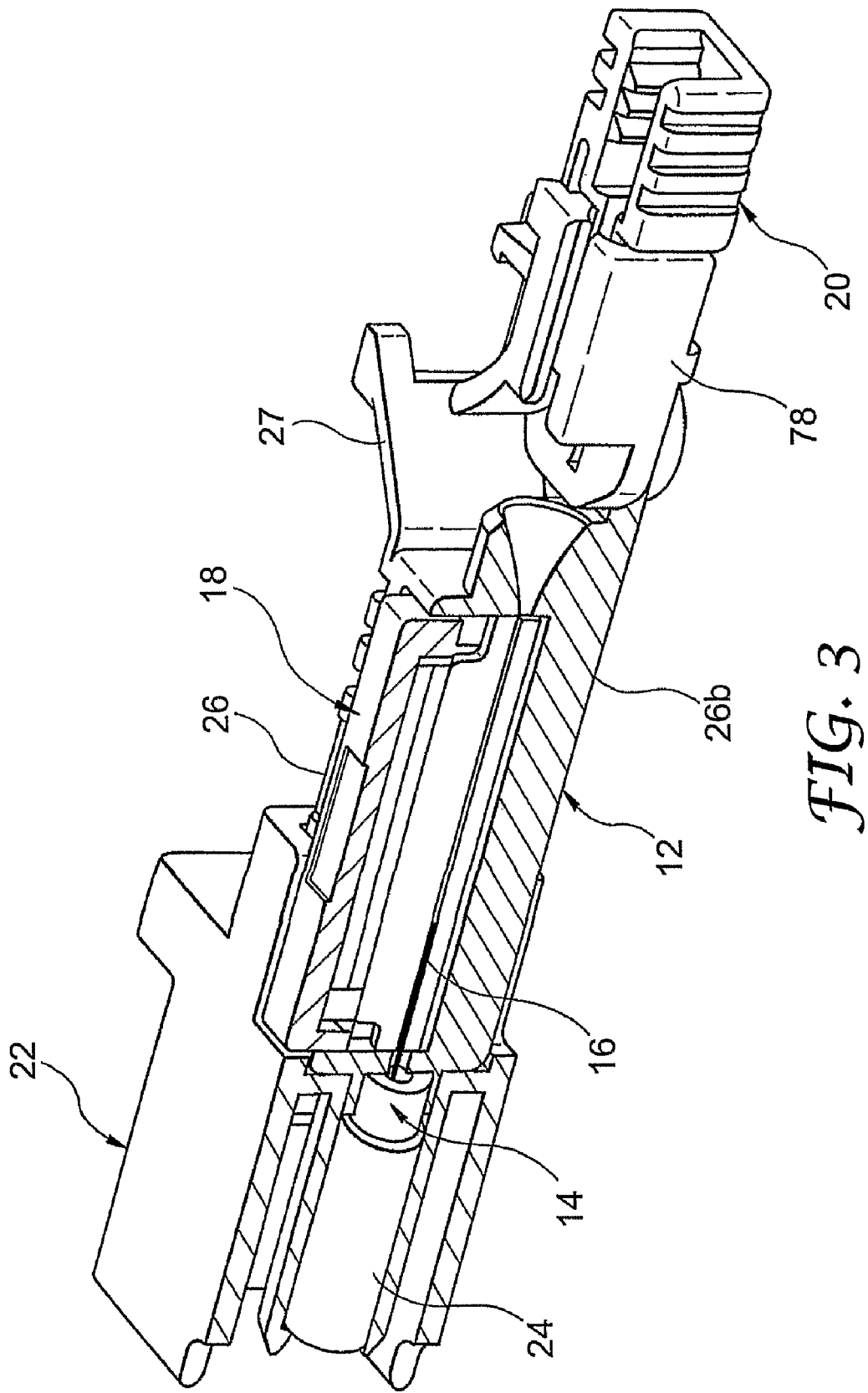
FIG. 3 is a cross-sectional perspective view of the optical connector of FIG. 2.

FIG. 1 to FIG. 3 are views of an angle type optical connector 10 according to an embodiment of the present invention, while FIG. 4 to FIG. 9 are views of components of the optical connector 10. The optical connector 10 in particular enables a connection part of an optical transmission line able to be freely connected and separated to be easily formed at the installation site of the optical transmission line. Further, the optical connector 10 is an angle type optical connector provided with a cable holding part for holding an optical fiber cable in a state bent with respect to the ferrule.

As shown in FIG. 1 to FIG. 3, the optical connector 10 is comprised of a body 12, a ferrule 14 provided at the body 12, an incorporated optical fiber 16 of a predetermined length securely supported at the ferrule 14, a splicing section 18 provided at the body 12 near the ferrule 14 and able to operate so as to securely support the incorporated optical fiber 16 projecting out from the ferrule 14 and an optical fiber of an optical fiber cable introduced from outside of the body 12 in an end-abutting condition, and a cable holding member 20 provided at the body 12 at an opposite side to the ferrule 14 from the splicing section 18 and able to hold an optical fiber cable.

The body 12 of the optical connector 12 has an adapter 22 attached to it for enabling a second optical connector (not shown) having a second ferrule to be made to concentrically abut against the ferrule 14 to be detachably combined with optical connector 10 at the front end area in the axial direction where the ferrule 14 is arranged. The adapter 22 includes a tubular elastic positioning element (that is, a split sleeve) 24 for positioning the ferrule 14 and the second ferrule coaxially and holding them aligned in the state with their abutting end faces abutting against each other. Note that further actions of the adapter 22 will be explained later.

Figure 4:
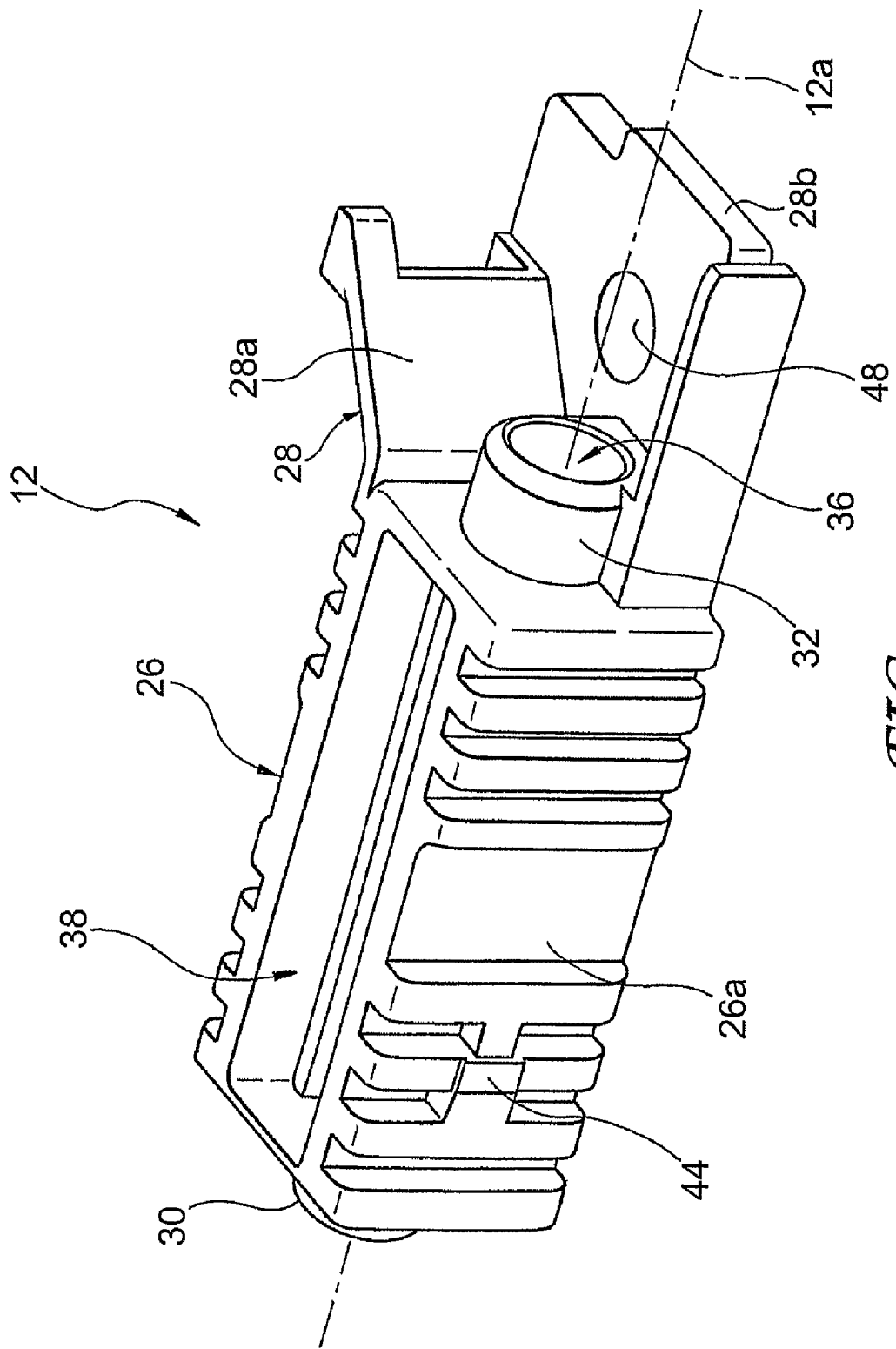
FIG. 4 is an overall perspective view of the entirety of the optical connector of FIG. 1.

As shown in FIG. 1 and FIG. 4, the body 12 is provided with a hollow box shaped front portion 26 having a substantially box shaped contour and a rear portion 28 formed integrally adjoining the rear end (in the figure, the right end) of the front portion 26 to extend therefrom. The front portion 26 is provided with tubular contour projecting walls 30 and 32 at the front end (in the figure, the left end) and rear end. The center axes of the projecting walls 30 and 32 define the main axis 12a of the body 12. The front end projecting wall 30 of the front portion 26 defines a first recess 34 securely receiving the ferrule 14. Further, the rear end projecting wall 32 of the front portion 26 defines an introduction opening 36 for an optical fiber to be introduced from outside to the body 12. Further, the front portion 26 of the body 12 is formed with a second recess 38 opening to one side (in the figure, above) between the first recess 34 and the introduction opening 36 and set with the splicing section 18. The first recess 34 and introduction opening 36 and the second recess 38 are communicated with each other through fiber insertion bores 40 and 42 positioned on the main axis 12a.

The front portion 26 of the body 12 is formed with a pair of stop pieces 44 locally rising up from the outer surface of the two side walls 26a defining the second recess 38. These stop pieces 44 have shapes and dimensions enabling them to be inserted into the pair of counter recesses 46 (FIG. 2) formed at corresponding positions of the adapter 22. The adapter 22 is attached securely to the body 12 by the corresponding stop pieces 44 of the body 12 snapping into the pair of counter recesses 46 along with its own elastic deformation.

The rear portion 28 of the body 12 is provided integrally with a side plate 28a extending obliquely outward from one side wall 26a of the front portion 26, and a bottom plate 28b extending from the front portion 26 perpendicular to the side plate 28a to form substantially the same plane as the bottom surface 26b of the front portion 26 (FIG. 3). The bottom plate 28b of the rear portion 28 is provided with a circular pivot hole 48 for movable attachment of the cable holding member 20 movably with respect to the body 12 at the intersecting area of the rear portion 28 with the main axis 12a. The rear portion 28 functions as the support part of the cable holding member 20. This function will be explained later. Note that the body 12 can be integrally fabricated from a suitable plastic material by for example an injection molding process.

Figure 5A:
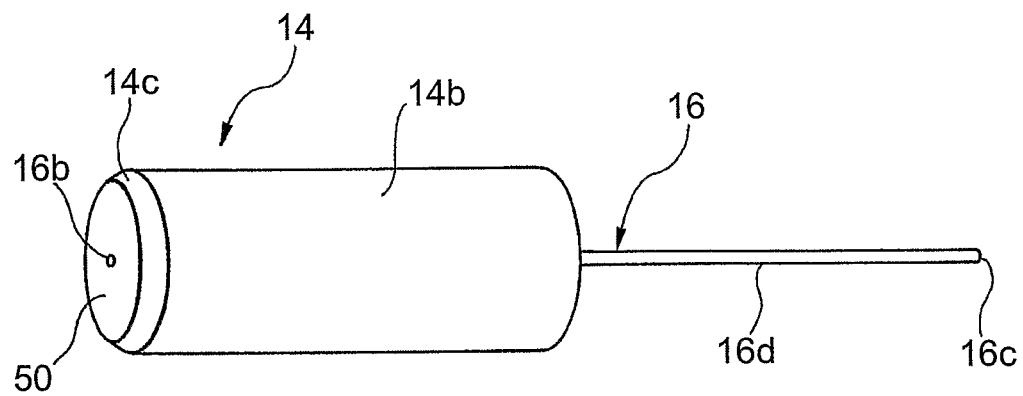
FIG. 5(a) is an overall perspective view and FIG. 5(b) is a cross-sectional view of a ferrule and an incorporated optical fiber built in the optical connector of FIG. 1.
Figure 5B:
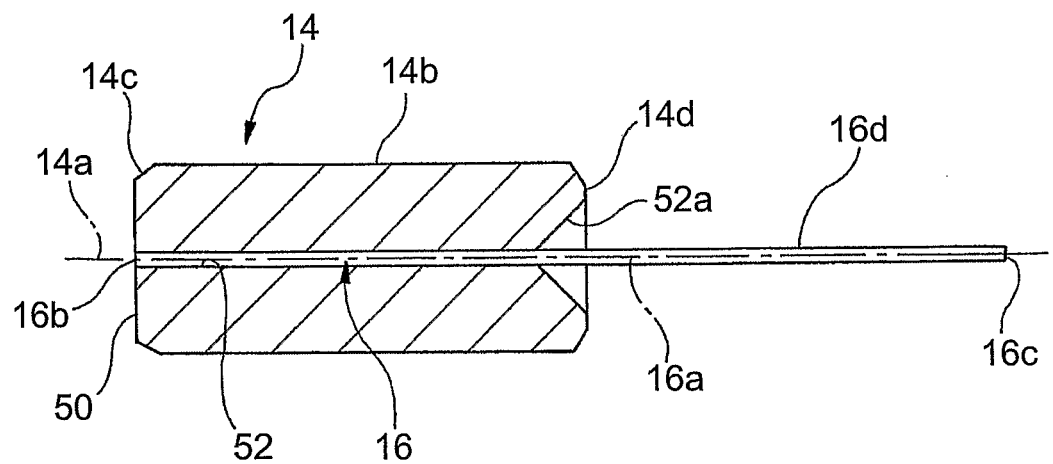

The ferrule 14 of the optical connector 10, as shown in FIGS. 5(a) and (b), is a tubular member formed with a single through hole along its center axis 14a for holding a fiber and has a cylindrical outer surface 14b functioning substantially overall as a single fiber centering part. The ferule 14 is provided with an abutting end face 50 at one end in the axial direction extending flat substantially perpendicular to the center axis 14a and a fiber holding channel 52 opening at the center of the abutting end face 50 and extending straight along the center axis 14a. The abutting end face 50 is communicated with the cylindrical outer circumference 14b through a tapered surface 14c. The fiber holding channel 52 is enlarged in diameter from the tapered guide surface 52a at the opposite side from the abutting end face 50 and opens to a ring-shaped end face 14d of the other end in the axial direction. Note that the ferrule 14 can be fabricated from ceramic, plastic, etc.

The fiber holding channel 52 of the ferrule 14 has part of one incorporated optical fiber 16 having a predetermined length inserted in it and secured by an adhesive (not shown). The incorporated optical fiber 16 is arranged with its center axis 16a matching with the center axis 14a of the ferrule 14. Here, the incorporated optical fiber 16 usually is finished in formation of its axial direction end faces 16b and 16c at the connector production plant or other facility. Explaining this process in detail, first, any length of optical fiber is inserted into the fiber holding channel 52 of the ferrule 14 and secured by an adhesive, then the abutting end face 50 of the ferrule 14 is polished, whereby the end face of the optical fiber exposed at the abutting end face 50 is made a flat surface the same as the abutting end face 50 and a flat front end face 16b perpendicular to the axis 16a is formed. Further, a predetermined location of the optical fiber projecting out from the ring-shaped end face 14d of the ferrule 14 is sliced and cut using a cutting tool, whereby a flat rear end face 16c perpendicular to the axis 16a is formed and a projecting portion 16d of a predetermined length is formed.

The ferrule 14 is secured to the first recess 34 of the body 12 by press-fitting or adhesion at an area around the ring-shaped end face 14d. In this state, the axis 14a of the ferrule 14 is arranged matched with the axis 12a of the body 12, and a main length portion of the ferrule 14 including the abutting end face 50 is arranged exposed from the body 12. Further, the projecting portion 16d of the incorporated optical fiber 16 is passed through the fiber insertion bore 40 of the body 12 and extended to the inside of the second recess 38. Note that usually the optical connector 10 is stored and transported in the state with the adapter 22 attached to the body 12 and the exposed ferrule 14 concealed by the adapter 22.

Figure 6A:
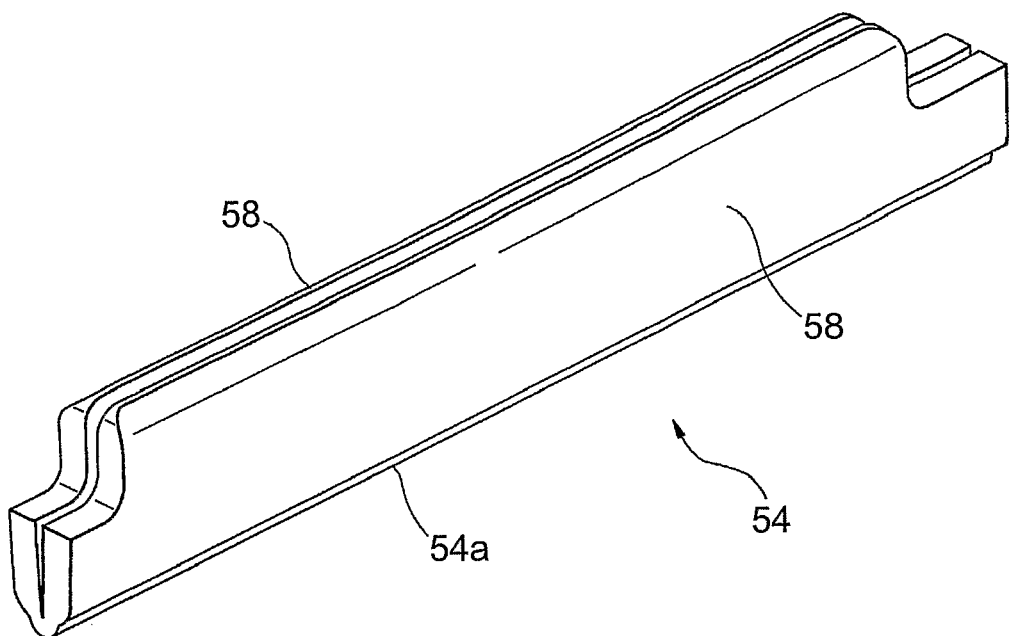
FIG. 6 shows views of a splicing section built in the optical connector of FIG. 1, wherein (a) is a perspective view of a fiber securing member and (b) is a perspective view of an actuating member.
Figure 6B:
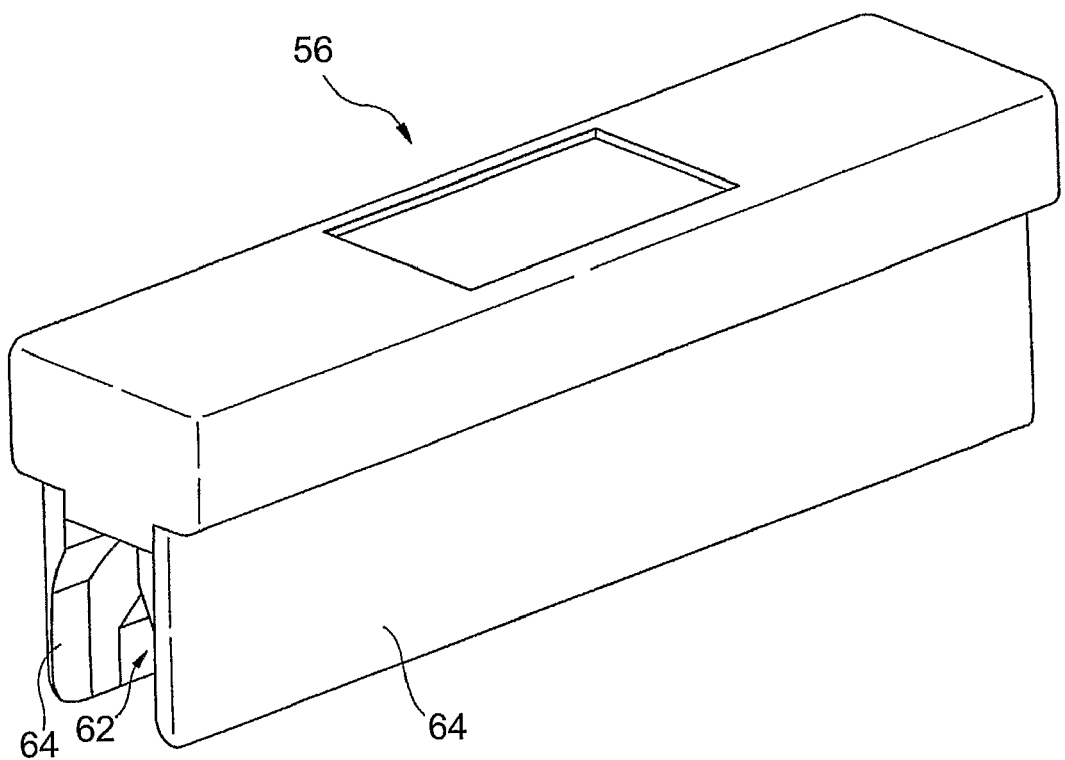
Figure 7A:
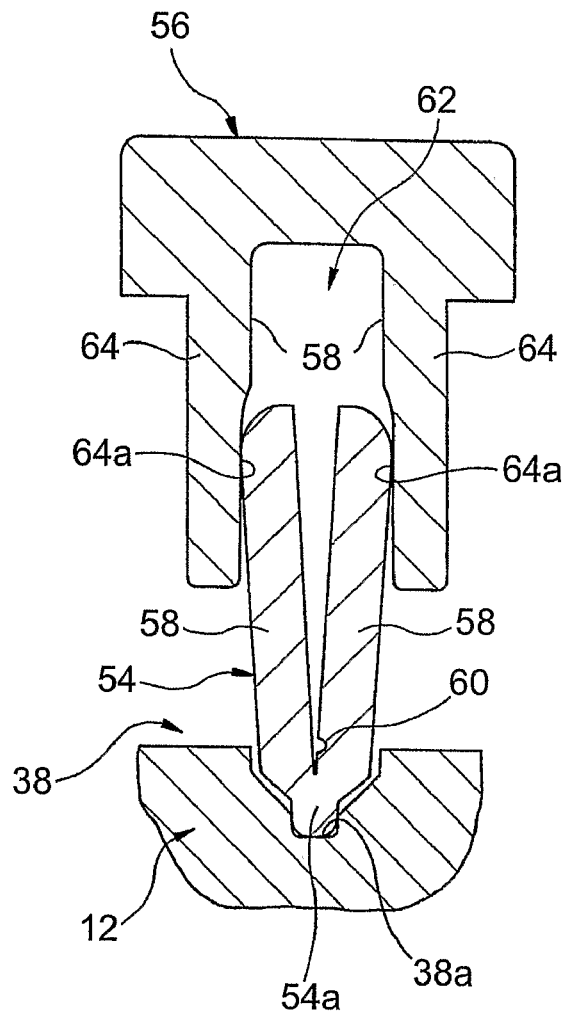
FIG. 7 shows views for explaining the operation of the splicing section of FIG. 6, wherein (a) shows the open position and (b) shows the closed position.
Figure 7B:
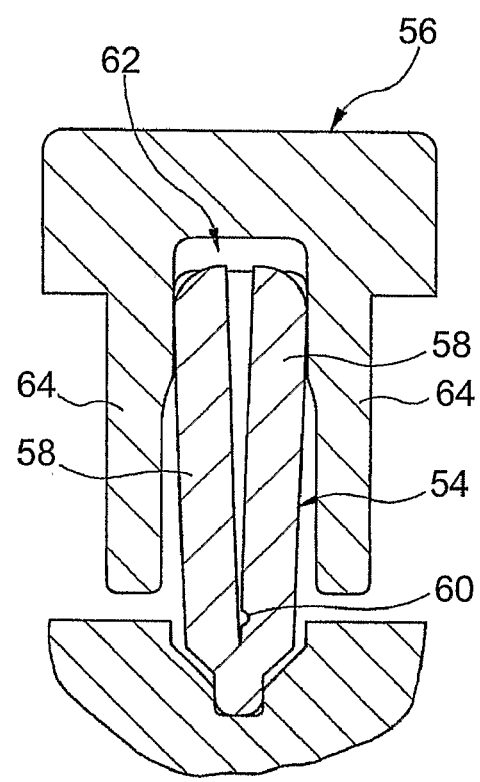
Figure 8:
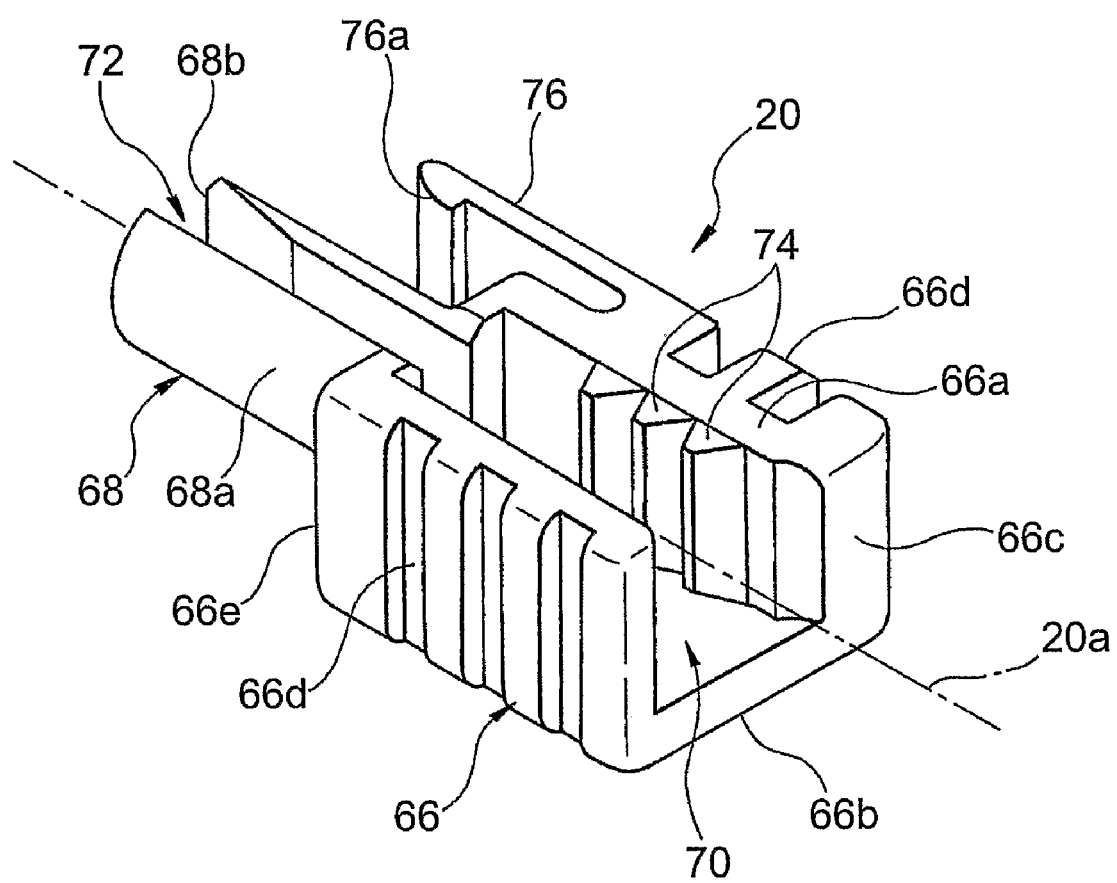
FIG. 8 is a perspective view of a cable holding member built in the optical connector of FIG. 1.

The splicing section 18 of the optical connector 10, as shown in FIG. 1 and FIG. 6, is comprised of a fiber securing member 54 accommodated in the second recess 38 of the body 12 and able to open and close (FIG. 6(a)) and an actuating member 56 accommodated in the second recess 38 and opening and closing the fiber securing member 54 (FIG. 6(b)). The fiber securing member 54 is comprised of a thin sheet member formed into a predetermined shape in advance from aluminum or another malleable material and folded into two along its center axis. The folded fiber securing member 54 is therefore provided with a pair of wings 58 arranged across a butterfly joint 54a along its fold. Predetermined positions of the facing surfaces of the wings 58 (in the illustrated embodiment, one wing 58) are formed with straight securing grooves 60 (for example, V-grooves with V-cross sections) able to be arranged coaxially with the fiber securing channel 52 of the ferrule 14 (FIG. 5) in parallel with the butterfly joint 54a.

The pair of wings 58 of the fiber securing member 54 are designed to be able to rock about the butterfly joint 54a, that is, open and close, along with elastic deformation of the material at the area of the butterfly joint 54a. Usually, the fiber securing member 54 is placed in an open position (FIG. 7(a)) where the two wings 58 are separated from each other somewhat at their facing surfaces. By applying external force from the open position to the direction separating the two wings 58 from each other, the facing surfaces displace to the closed position where they are further brought together against the elastic return force of the butterfly joint 54a (FIG. 7(b)). When the fiber securing member 54 is at the open position, the projecting portion 16d of the incorporated optical fiber 16 secured to the ferrule 14 is arranged adjoining the securing groove 60 in parallel to it, while the optical fiber (not shown) of the optical fiber cable inserted from the outside can be smoothly withdrawn from and inserted into the securing groove 60. Further, when the fiber securing member 54 is at the closed position, the projecting portion 16*d* of the incorporated optical fiber 16 and the optical fiber of the outside optical fiber cable are tightly received in the securing groove 60 and are strongly securely supported at the securing groove 60 under pressure received from the two wings 58.

The actuating member 56 is for example a lid-shaped member comprised of a one-piece molding of a plastic material and is provided with a pair of holding walls 64 for defining a recess 62 of dimensions enabling the two wings 58 of the fiber securing member 54 to be received. These holding walls 64 face each other substantially in parallel across a predetermined space and have these facing surfaces formed as stepped surfaces having primary pressing surfaces 64*a* at the open end sides of the recess 62 (lower side in the figure) and secondary pressing surfaces 64*b* at the inside side of the recess 62 (upper side in the figure) (FIG. 7). Therefore, the recess 62 is formed with a relatively broad area defined by the two primary pressing surfaces 64*a* and a relatively narrow area defined by the two secondary pressing surfaces 64*b*.

The fiber securing member 54 sits with its butterfly joint 54*a* at the bottom surface 38*a* of the second recess 38 of the body 12 and is housed in the second recess 38 in the state enabling an opening and closing operation. The actuating member 56 is designed to block the side opening of the second recess 38 of the body 12 and is received in the second recess 38 in a movable manner. At this time, the actuating member 56 receives the two wings 58 of the fiber securing member 54 at the recess 62 and supports the two wings 58 by hugging them from the outsides step by step by the two holding walls 64 at the pressing surfaces 64*a* and 64*b* along with movement of the actuating member 56. Therefore, the actuating member 56 applies pressure from the two holding walls 64 to the two wings 58 of the fiber securing member 54 in the direction bringing them together and makes the fiber securing member 54 operate to displace from the open position to the closed position while moving from the temporary position (FIG. 1) to the finished position with respect to the body 12 (FIG. 7).

The cable holding member 20 of the optical connector 10 is provided with a rear portion 66 having a substantially block-like outer shape and a tubular front portion 68 running integrally from one side face of the rear portion 66. The rear portion 66 is formed with a receptive groove 70 for receiving the optical fiber cable for attachment with the optical cable 10, while the front portion 68 is provided with a guide bore 72 communicated with the receptive groove 70 and guiding the covered optical fiber of the optical fiber cable toward the front portion 26 of the body 12. The receptive groove 70 and the guide bore 72 extend straight at positions substantially concentric with each other. Their center axes define the axis 20*a* of the cable holding member 20. Note that the cable holding member 20 can be formed integrally from a suitable plastic material by for example injection molding.

The rear portion 66 has at its outer surface a flat top surface 66*a* and bottom surface 66*b* extending in parallel to each other, a rear end face 66*b* substantially perpendicular to the top surface 66*a* and bottom surface 66*b* at the opposite side from the front portion 68, and a pair of side surfaces 66*d* substantially perpendicular to the top surface 66*a*, bottom surface 66*b*, and rear end face 66*c*. The substantially rectangular cross-section receptive groove 70 opens to both the top surface 66*a* and rear end face 66*c*. Further, the front portion 68 has a peripheral surface 68*a* extending in a partially tubular manner and a front end face 68*b* substantially perpendicular to the peripheral surface 68*a* at the opposite side from the rear portion 66. The substantially U-section guide bore 72 opens at the front end face 68*c* and opens at the peripheral surface 68*a* through the opening at the top surface 66*a* side of the receptive groove 70.

The rear portion 66 of the cable holding member 20 is further provided with a plurality of engaging projections 74 projecting out at the inside surfaces of the pair of side walls defining the receptive groove 70. These engaging projections 74 extend in parallel to each other on the inside surfaces of the side walls in a direction substantially perpendicular to the top surface 66*a* of the rear portion 66. The individual engaging projections 74 project out from the inside surfaces of the side walls with substantially triangular cross-sections. Preferably, the angles of inclination of the inclined faces of the rear end face 66*c* sides with respect to the inside surfaces of the side walls are smaller than the angles of inclination of the inclined faces at the guide bore 72 sides. The thus saw-tooth arrayed engaging projections 74 engage so as to bite into the sheath of the optical fiber cable received in the receptive groove 70 at their top areas and statically hold the optical fiber cable in the receptive groove 70. In particular, by forming the plurality of engaging projections 74 in saw-tooth shapes having the above orientations, the cable holding member 20 can strongly prevent an operation moving the optical fiber cable received in the receptive groove 70 toward the rear end face 66*c* more than an operation moving it toward the front end face 68*c*.

The rear portion 66 of the cable holding member 20 is further provided with an elastic arm 76 extending from one side surface 66*d* to the front portion 68 substantially in parallel to the axis 20*a*. The elastic arm 76 is integrally connected with the rear portion 66 at its base end, sticks out over the shoulder 66*e* of the rear portion 66 forming the boundary with the front portion 68 at the free end of the terminal end, and can elastically rock about its base end in the direction approaching or moving away from the rear portion 66 and front portion 68. The terminal end of the elastic arm 76 is provided with an anchoring tab 76*a* rising locally to the inside.

Figure 9:
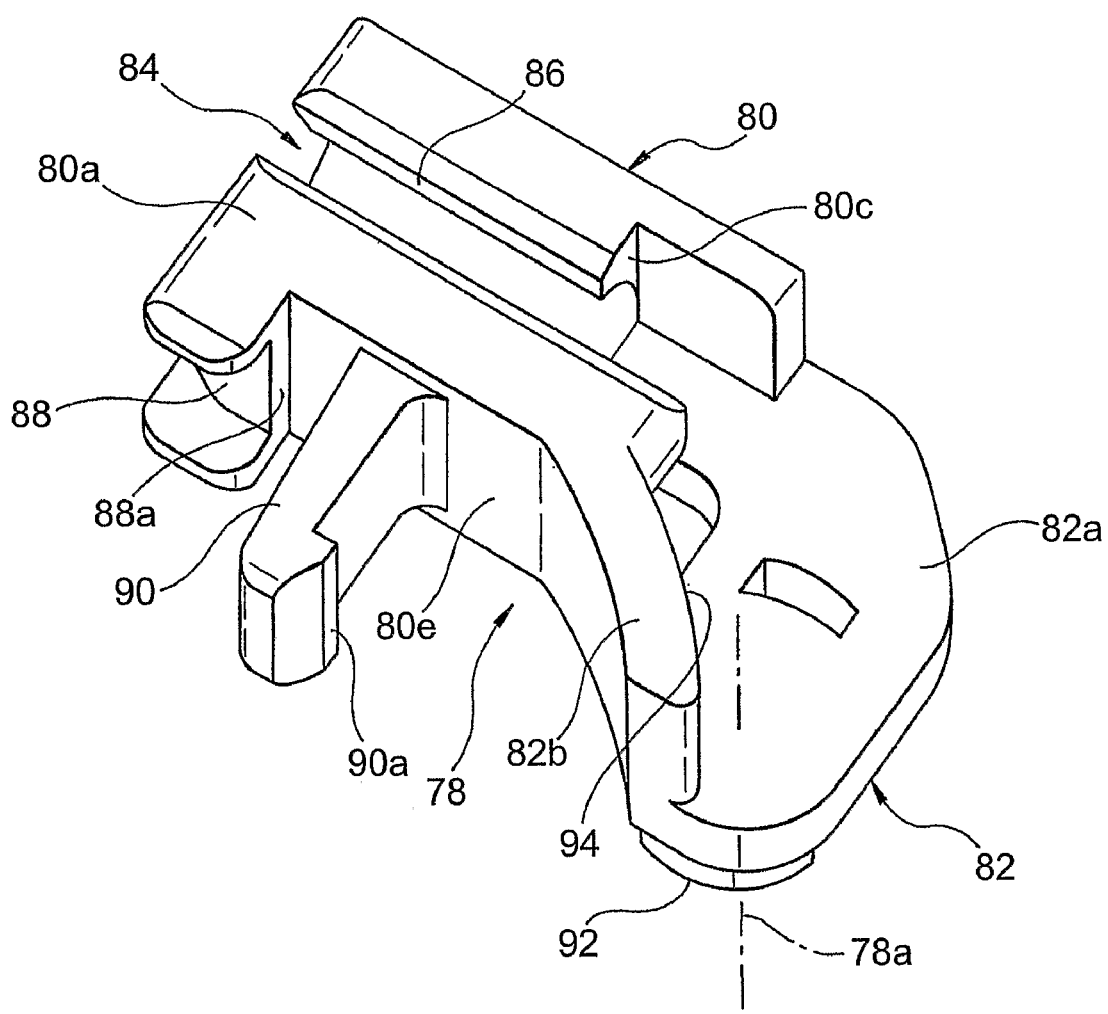
FIG. 9 is a perspective view of an attaching member built into the optical connector of FIG. 1.

The cable holding member 20 is attached to the rear portion 28 of the body 12 through the attaching member 78. As shown in FIG. 1 and FIG. 9, the attaching member 78 is provided integrally with a supporting portion 80 for supporting the front portion 68 of the cable holding member 20 and a pivoting portion 82 for pivotally attaching the attaching member 78 to the rear portion 28 of the body 12. The attaching member 78 can be fabricated integrally from a suitable plastic material by for example an injection molding process.

Figure 13:
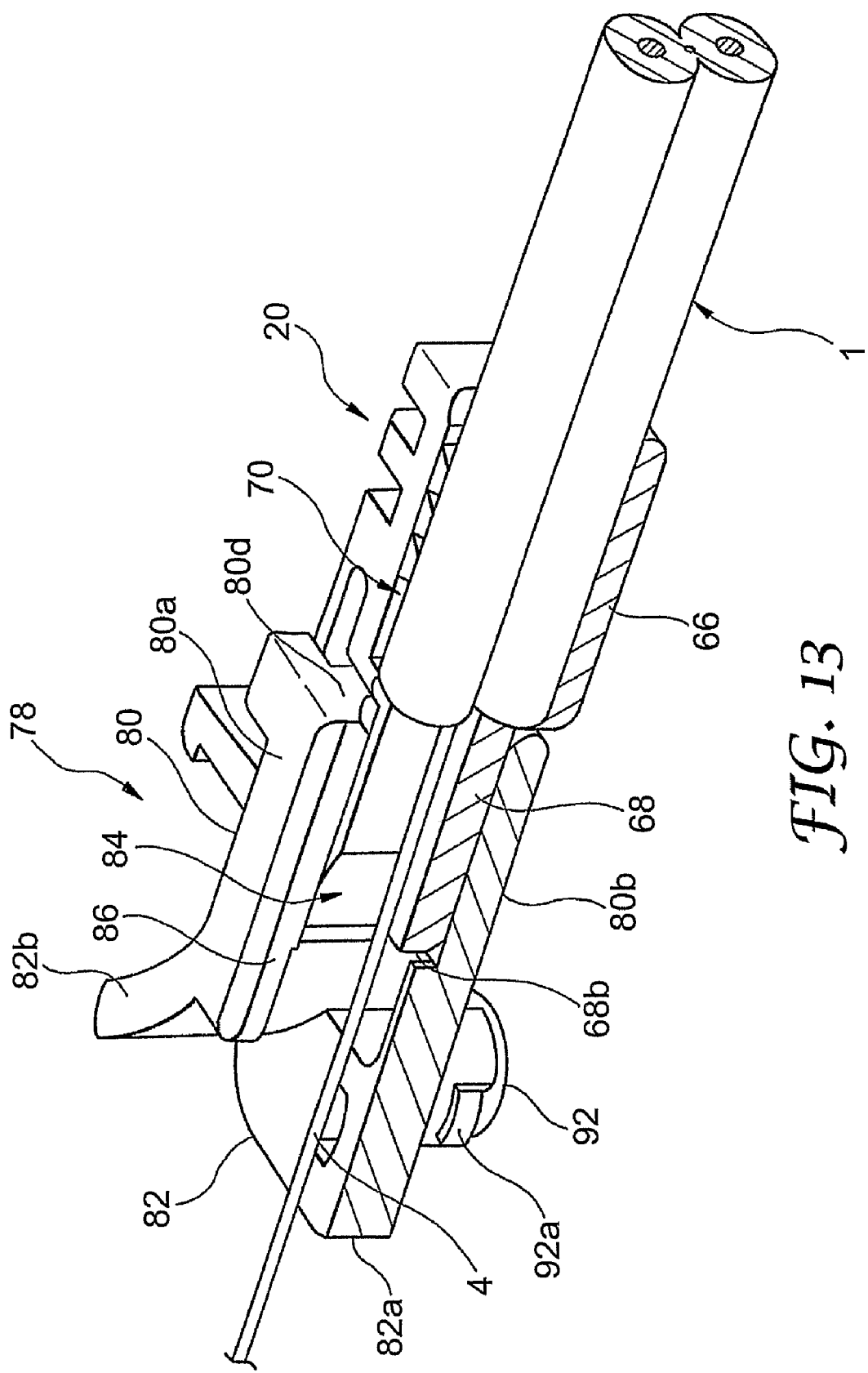
FIG. 13 is a cross-sectional view of a cable holding member attached to an attaching member in the splicing operation of FIG. 10.

The supporting portion 80 of the attaching member 78 is formed with a receiving bore 84 for receiving the front portion 68 of the cable holding member 20 with substantially no rattling. The supporting portion 80 has, at its outside surface, a substantially flat top surface 80*a* and bottom surface 80*b* extending in parallel with each other (FIG. 13), an inside end face 80*c* substantially perpendicular to the top surface 80*a* at the boundary with the pivoting portion 82, an outside end face 80*d* substantially perpendicular to the top surface 80*a* at the other side from the inside end face 80*c* (FIG. 13), and a pair of side surfaces 80*e* substantially perpendicular to the top surface 80*a*, bottom surface 80*b*, and two end faces 80*c* and 80*d*. The substantially circular cross-section receiving bore 84 opens to the two end faces 80*c* and 80*d* and opens through the slit 86 to the top surface 80*a*.

The supporting portion 80 is further provided with a receiver 88 projecting outward from one side surface 80*e* adjoining the outer end face 80*d*. The receiver 88 is formed with a shoulder 88*a* substantially perpendicular to the side surface 80e at the side away from the outer end face 80d. When the front portion 68 of the cable holding member 20 is correctly inserted into the receiving bore 84 of the supporting portion 80, the stop tab 76a of the elastic arm 76 provided at the rear portion 66 of the cable holding member 20 elastically rides over the receiver 88 of the supporting portion 80 and engages with the shoulder 88a. Due to this, the cable holding member 20 is securely attached to the attaching member 20. Further, the supporting portion 80 is provided with an elastic arm 90 projecting outward at a position close to the pivoting portion 82 at the same side surface 80e as the receiver 88. The terminal end of the elastic arm 90 is provided with a stop tab 90a locally rising to the pivoting portion 82 side. The action of the elastic arm will be explained later.

The pivoting portion 82 of the attaching member 78 is provided with a bottom plate 82a extending from the supporting portion 80 forming substantially the same plane as the bottom surface 80b of the supporting portion 80 (FIG. 13) and a side plate 82b curved so as to fan out from one side surface 80e of the supporting portion 80 having the elastic arm 90 and extending from the supporting portion 80 and perpendicularly intersecting the bottom plate 82a. The bottom plate 82a of the pivoting portion 82 is provided with a cylindrical pivot shaft 92 attaching the attaching member 78 rotatably with respect to the rear portion 28 of the body 12 at the back surface of the terminal area away from the supporting portion 80 (surface at opposite side to side plate 82b). The pivot shaft 92 is inserted rotatably into a pivot bore 48 provided at the bottom plate 28b of the rear portion 28 of the body 12 (FIG. 5) and defines the axis of rotation 78a of the attaching member 78. Further, the pivot shaft 92 holds the attaching member 78 so as not to detach from the body 12 by snappingly engaging a plurality of tabs 92a provided at the outer circumference with the back surface of the bottom plate 28b of the rear portion 28 of the body.

The side plate 82b of the pivoting portion 82 is arranged offset outward somewhat from the axis of rotation 78a of the attaching member 78. The side plate 82b is provided with a fiber guide surface 94 curved outward into an arc shape by a predetermined bending radius slightly larger than the smallest bending radius preset for the optical fiber cable to be attached to the optical connector 10. The action of the fiber guide surface 94 will be explained later.

In this way, the attaching member 78 receives the front portion 68 of the cable holding member 20 at the receiving bore 84 of the supporting portion 80 to securely support the cable holding member 20 and in that state is pivotally attached to the rear portion 28 of the body 12 through a pivot shaft 92 of the pivoting portion 82. In this state, the introduction opening 36 of the projecting wall 32 provided at the rear end of the front portion 26 of the body 12 and the front end face 68b of the front portion 68 of the cable holding member 20 supported at the attaching member 78 are separated by exactly a predetermined distance (FIG. 1). Further, the cable holding member 20 is arranged to be able to move together with the attaching member 78 with respect to the body 12 around the axis of rotation 78a extending in a direction intersecting with the direction of extension (that is, the main axis 12a) of the incorporated optical fiber. Note that the axis of rotation 78a of the attaching member 78 (and cable holding member 20) defined by the pivot shaft 92 is at a position between the introduction opening 36 of the body 12 and the front end face 68b of the cable holding member 20 and is arranged shifted from the main axis 12a of the body 12 to a position close to the side plate 28a of the rear portion 28 of the body 12.

Figure 10:
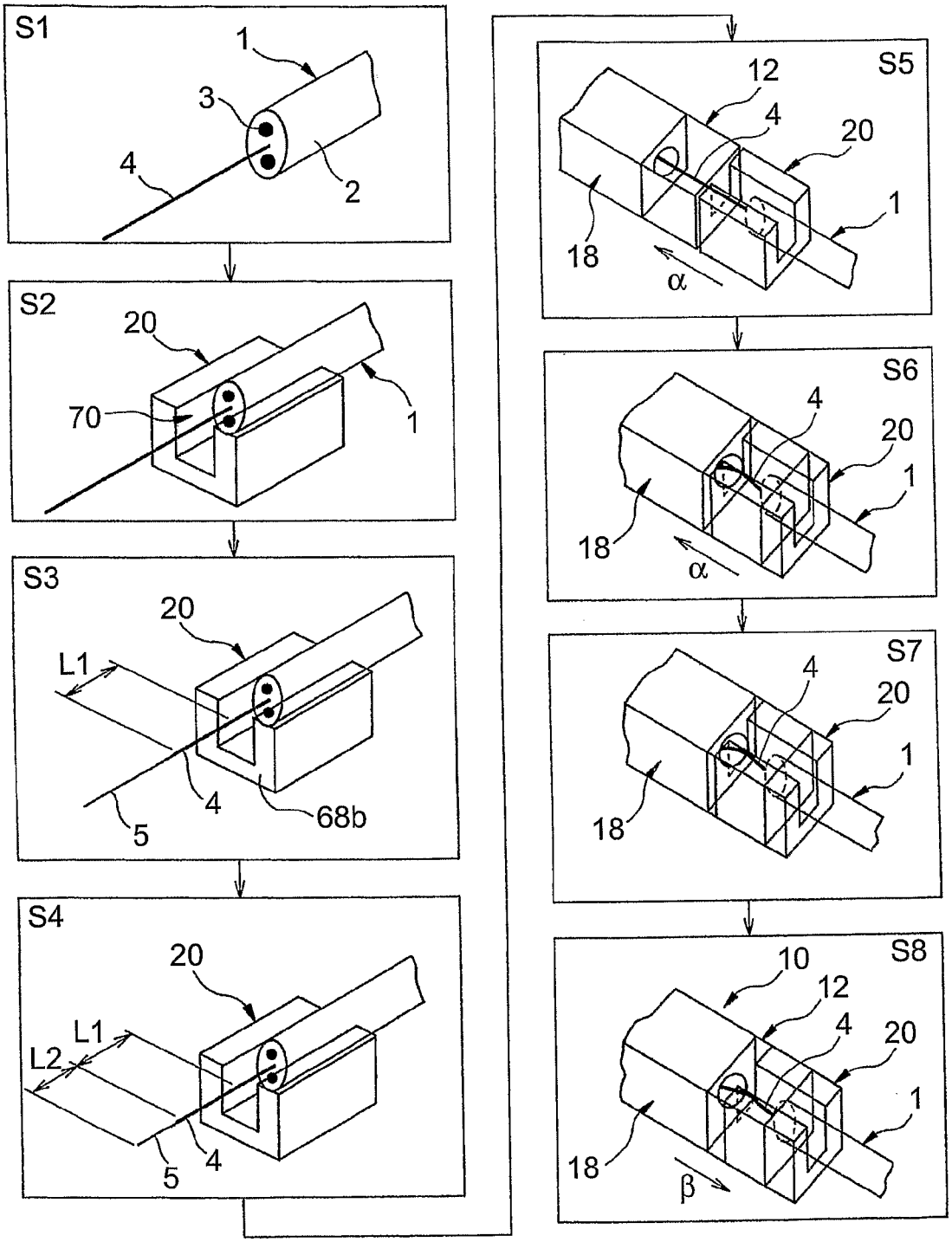
FIG. 10 is a flow chart showing schematically a cable terminating operation and splicing operation in the optical connector of FIG. 1.

In the state holding the optical fiber cable attached with the optical connector 10, the cable holding member 20 can be set at the temporary position making the optical fiber of the optical fiber cable abut against the incorporated optical fiber at the splicing section 18 and bending the covered optical fiber of the optical fiber cable between the splicing section 18 and the cable holding member 20 under a pressing force in the lengthwise direction. Further, after the splicing section 18 securely supports the incorporated optical fiber 16 and the optical fiber of the optical fiber cable in an end-abutting condition, the cable holding member 20 can be set at the finished position releasing the pressing force in the lengthwise direction to the covered optical fiber of the optical fiber cable. This characterizing configuration will be explained with reference to the cable terminating operation and splicing operation shown schematically in FIG. 10.

Figure 11A:
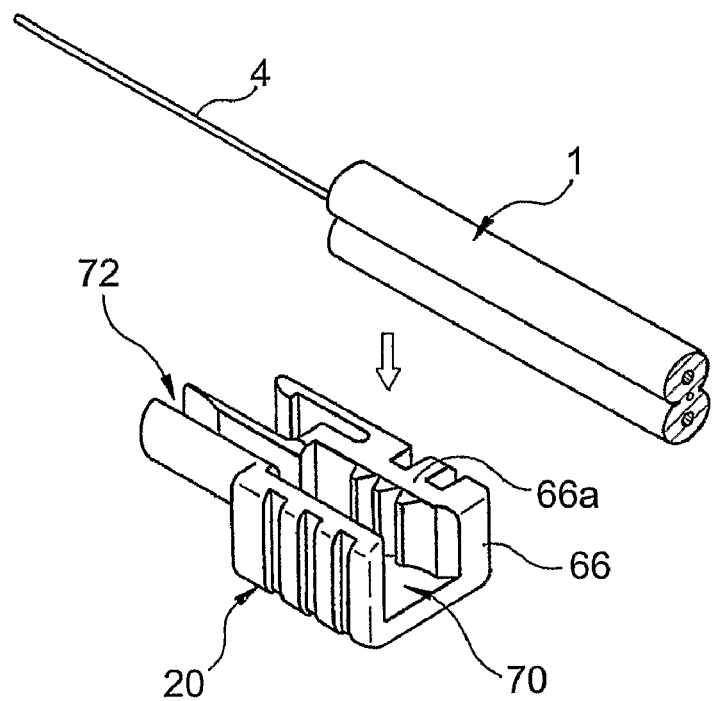
FIG. 11 shows views showing an insertion procedure of an optical fiber cable into a cable holding member in the terminating operation of FIG. 10.
Figure 11B:
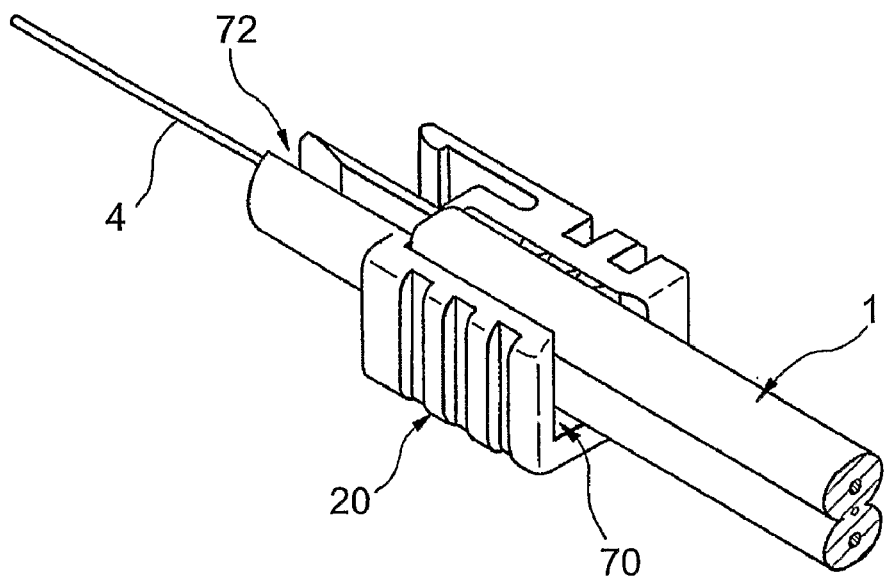

First, as the cable terminating operation, the sheath 2 and the tension members 3 are stripped off of the desired length of the terminal end of the optical fiber cable 1 to be attached so as to expose the covered optical fiber 4 (step S1). Next, this optical fiber cable 1 is inserted into the receptive groove 70 of the cable holding member 20 of the optical connector 10 where it is statically held (step S2). Note that at this time, the optical fiber cable 1 and the exposed covered optical fiber 4, as shown in FIG. 11, can be easily inserted into the receptive groove 70 and guide bore 72 of the cable holding member 20 from the top surface 66a side of the rear portion 66.

Figure 12:
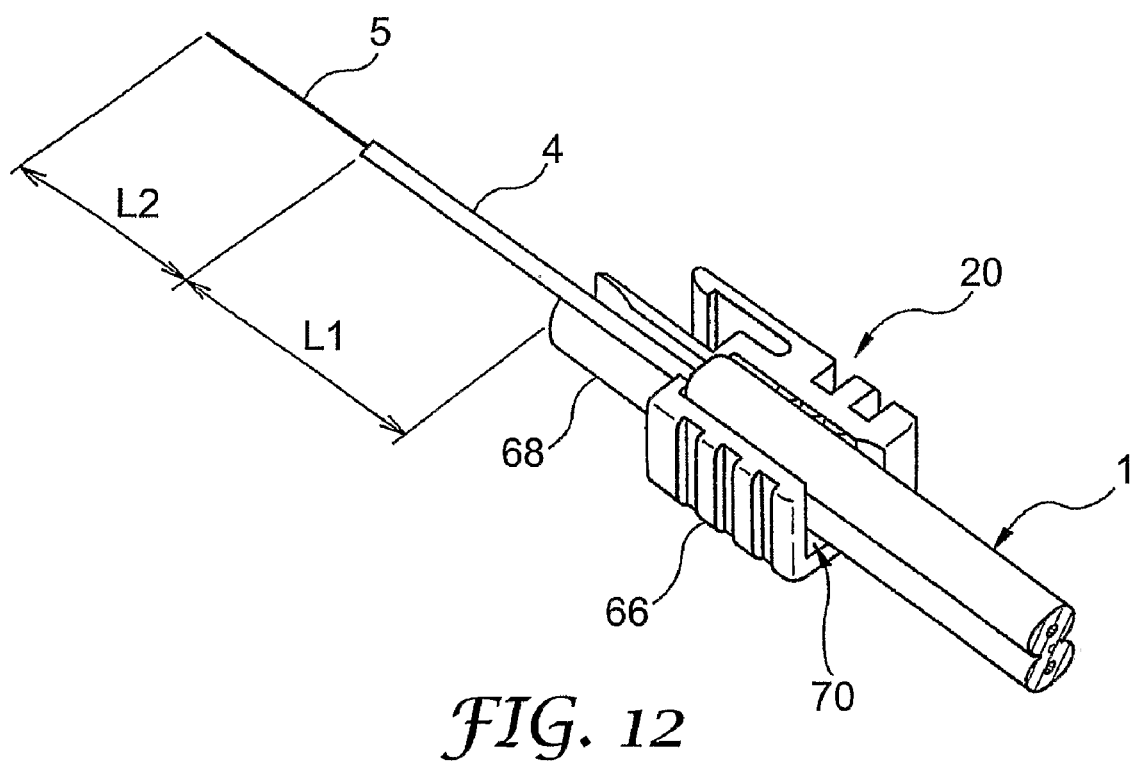
FIG. 12 is a perspective view of an optical fiber cable for which the cable terminating operation of FIG. 10 has been completed.

In the state with the optical fiber cable 1 inserted into the receptive groove 70 of the cable holding member 20, the covering is stripped off the desired length of the front end of the covered optical fiber 4 to expose the optical fiber 5 (step S3). At this time, the covering is left at the desired length L1 from the front end face 68c of the front portion 68 of the cable holding member 20 (FIG. 8) and the length of the covered optical fiber 4 is determined. Next, the exposed optical fiber 5 is sliced and cut by a special cutting tool at a location of the predetermined length L2 from the covering end of the covered optical fiber 4 (step S4). Due to this, the length of the optical fiber 5 is determined and the end face of the optical fiber 5 is formed. This cable terminating operation can be performed at the installation site of the optical transmission line. Further, the cable holding member 20 holding the terminated optical fiber cable 1 is shown in FIG. 12.

Next, as the splicing operation, in the state with the fiber securing member 54 of the splicing section 18 of the optical connector 10 set to the open position, the cable holding member 20 holding the terminated optical fiber cable 1 is attached to the attaching member 78 set at the rear portion 28 of the body 12 as explained above and set at the rear end area of the front portion 26 of the body 12 in the axial direction (FIG. 1). Along with the axial direction movement of the cable holding member 20 with respect to the attaching member at the time of attachment (arrow α), the optical fiber 5 is inserted into the securing groove 60 of the fiber securing member 54 of the splicing section 18 (FIG. 1) (step S5). Further, simultaneously, the exposed covered optical fiber 4 of the optical fiber cable 1 is extended from the receiving bore 84 of the supporting portion 80 of the attaching member 78 to the pivoting portion 82 (this state shown in FIG. 13). Note that at this time, the covered optical fiber 4 and the optical fiber 5 of the optical fiber cable 1 can be quickly arranged at the receiving bore 84 through the slit 86 of the attaching member 78.

Figure 14:
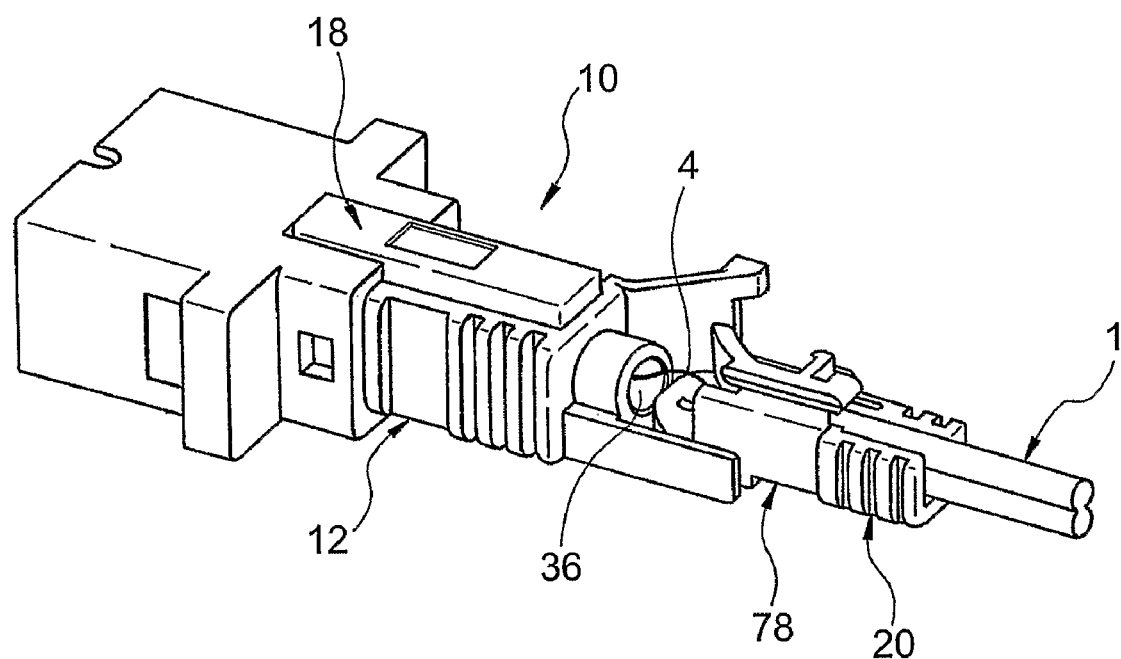
FIG. 14 is a perspective view of the state with the cable holding member set at the temporary position in the splicing operation of FIG. 10.

Then, the cable holding member 20 is set together with the attaching member 78 at the temporary position at the body 12 where the receptive groove 70 extends in a direction substantially parallel to the direction of extension of the incorporated optical fiber 16 (FIG. 1). At the temporary position, the cable holding member 20 is arranged to match with the main axis 12a of the body 12 at its axis 20a. Simultaneously, at the splicing section 18, the sliced end face of the optical fiber 5 of the optical fiber cable 1 is made to abut against the rear end face 16c of the projecting portion 16d of the incorporated optical fiber 16 prearranged at the securing groove 60 of the fiber securing member 54 (FIG. 5) and the covered optical fiber 4 of the optical fiber cable 1 is bent under pressure in the lengthwise direction between the splicing section 18 and the cable holding member 20 (step S6). Due to this, as shown in FIG. 14, when the cable holding member 20 is arranged at the temporary position, the covered optical fiber 4 of the optical fiber cable 1 bent between the splicing section 18 and the cable holding member 20 is exposed between the introduction opening 36 of the body 12 and the front end face 68b of the cable holding member 20 (FIG. 13), so can be visually confirmed from outside of the optical connector 10. Note that before attaching the cable holding member 20 to the attaching member 78, it is possible to arrange the attaching member 78 on the body 12 at a position corresponding to the above temporary position.

While the cable holding member 20 is at the temporary position, the projecting portion 16d of the incorporated optical fiber 16 and the optical fiber 5 of the optical fiber cable 1 in the securing groove 60 of the fiber securing member 54 of the splicing section 18 are made to accurately abut at their two end faces by the pressing force in the lengthwise direction applied to the covered optical fiber 4 of the optical fiber cable 1. Therefore, after visually confirming the bending of the covered optical fiber 4, as explained above, the actuating member 56 of the splicing section 18 (FIG. 1) is operated to make the fiber securing member 54 move to the closed position while leaving the cable holding member 20 at the temporary position. Due to this, the incorporated optical fiber 16 and the optical fiber 5 are securely supported at the splicing section 18 in the end-abutting condition with each other (step S7).

Figure 15:
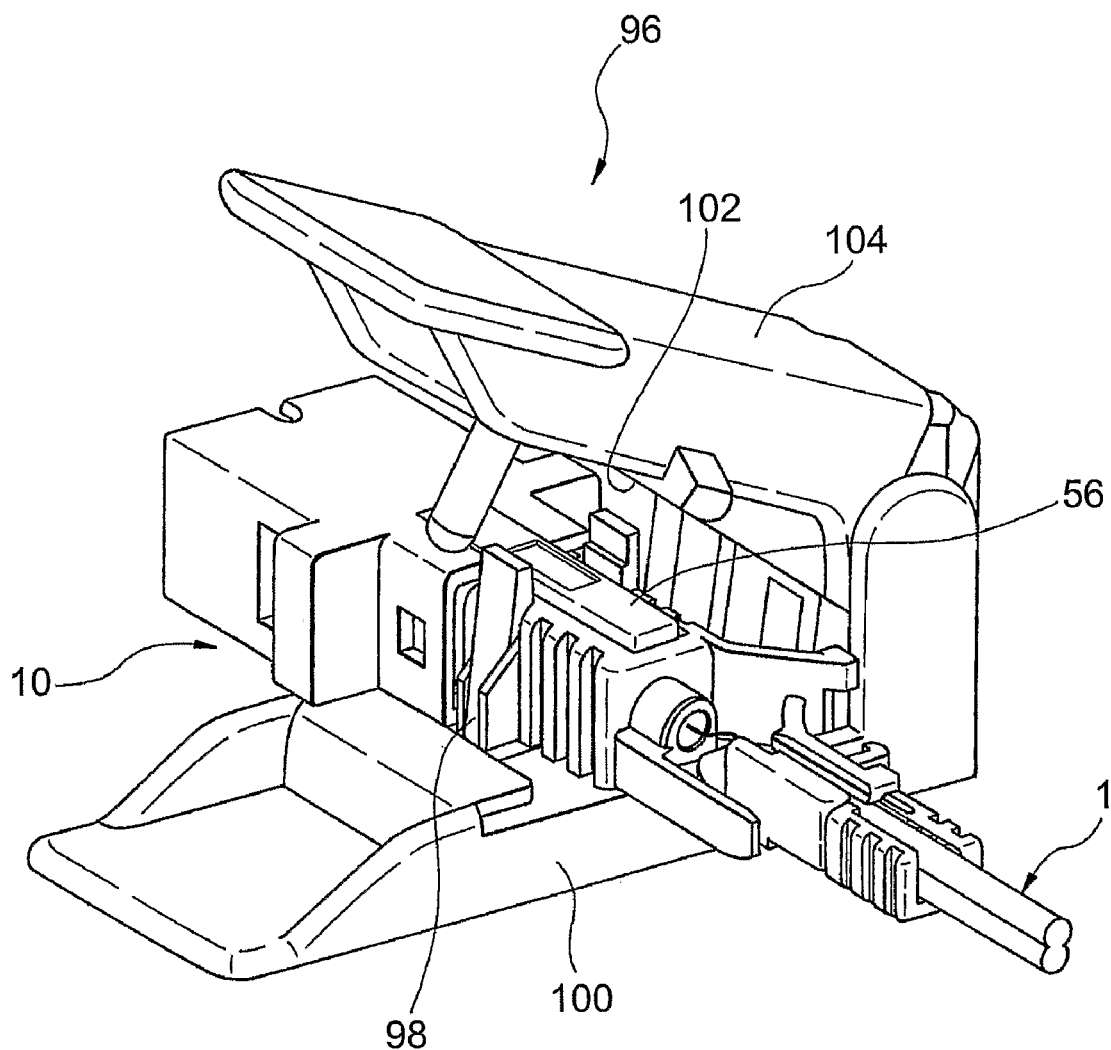
FIG. 15 is a perspective view of an assembly tool able to be used in the splicing operation of FIG. 10.

To operate the actuating member 56 of the splicing section 18, it is for example possible to use an assembly tool 96 such as shown in FIG. 15. The assembly tool 96 is provided with a base 100 having a connector mount 98 for mounting an optical connector 10 and an operating part 104 pivotally linked with the base 100 and having a pressing surface 102 for pressing the actuating member 56 of the optical connector 10. Such an assembly tool 96 eliminates the fiber holding part of the conventional assembly tool with the fiber holding part for holding the covered optical fiber of the optical fiber cable in a bent state, so is made remarkably smaller and simpler.

Figure 16:
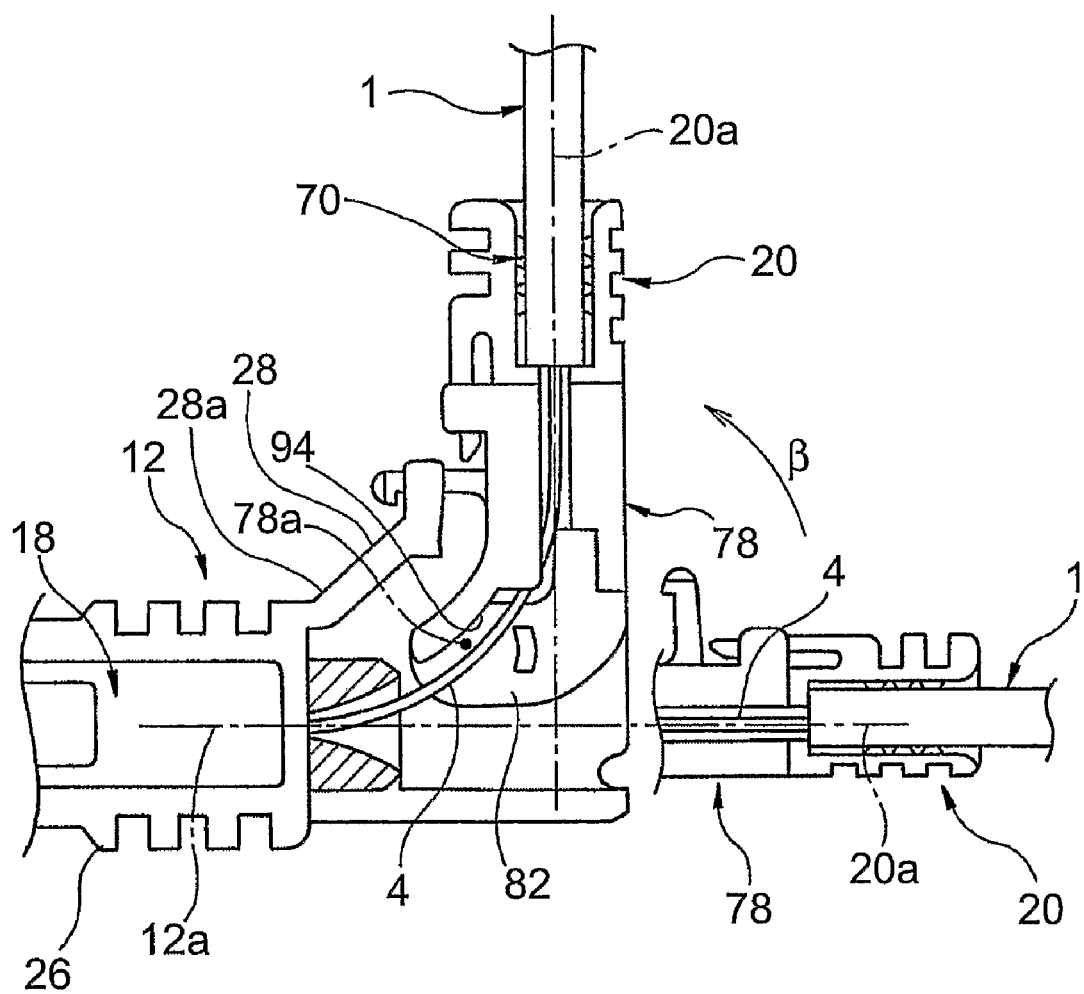
FIG. 16 is a plan view of the state of movement of the cable holding member from the temporary position to the finished position in the splicing operation of FIG. 10.

After the completion of the splicing operation, the cable holding member 20 is made to turn together with the attaching member 78 around the axis of rotation 78a on the body 12 in a direction (arrow β) approaching the side plate 28a of the rear portion 28 of the body 12 (FIG. 16). Due to this, the cable holding member 20 is set at the finished position where the receptive groove 70 extends in a direction intersecting (in the illustrated embodiment, perpendicular to) the direction of extension of the incorporated optical fiber 16 (step S8). At the finished position, the cable holding member 20 is arranged with its axis 20a perpendicular to the main axis 12a of the body 12 (FIG. 16). Simultaneously, the pressing force in the lengthwise direction which had been applied to the covered optical fiber 4 of the optical fiber cable 1 between the splicing section 18 and the cable holding member 20 is released. Further, when the cable holding member 20 is set at the finished position, as shown in FIG. 16 and FIG. 17, the covered optical fiber 4 of the optical fiber cable 1 is bent to a bending radius of at least the predetermined smallest bending radius without receiving any tension.

The above configuration for bending the covered optical fiber 4 by the allowable radius simultaneously with releasing the pressing force in the lengthwise direction on the covered optical fiber 4 is established depending on the angle of intersection of the axis 20a of the cable holding member 20 at the finished position and the main axis 12a of the body 12 (in the figure, a right angle), the distance between the cable holding member 20 and the front portion 26 of the body 12, and the position on the axis of rotation 78a of the cable holding member 20 (that is, the attaching member 78) with respect to the body 12. Further, when the cable holding member 20 is set at the finished position, the fiber guide surface 94 provided at the pivoting portion 82 of the attaching member 78 is set at a position close to but not touching the covered optical fiber 4 bent by the allowable radius. The fiber guide surface 94 effectively prevents the bent state covered optical fiber 4 from unintentionally ending up being bent by a bending radius smaller than the allowable radius due to external force. Alternatively, the fiber guide surface 94 can assist the bending action by lightly touching the bent state covered optical fiber 4 to an extent not giving tension to it.

Figure 17:
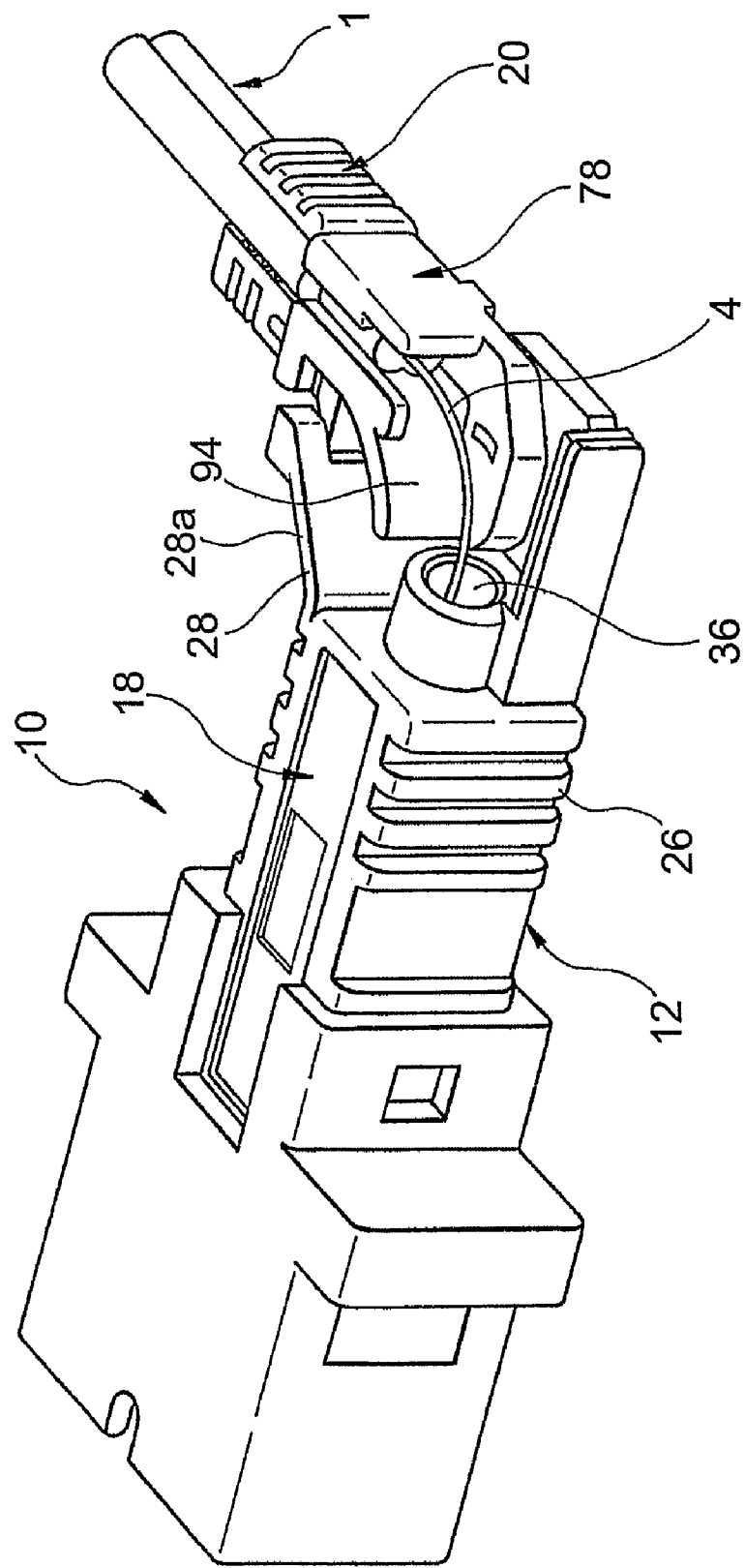
FIG. 17 is a perspective view of the state where the cable holding member is set at the finished position in the splicing operation of FIG. 10.

The allowable radius bent mode at the release of the pressing force of the covered optical fiber 4 is exposed between the front portion 26 of the body 12 and the cable holding member 20 and can be visually confirmed from outside of the optical connector 10 (FIG. 17). In this way, the optical connector 10 is attached to the optical fiber cable 1 in the state with the optical loss sufficiently reduced.

Note that as will be understood from the above flow, the length L2 of the optical fiber 5 of the optical fiber cable 1 determined at the cable terminating operation should be a length enabling the optical fiber 5 to be made to abut against the projecting portion 16d of the incorporated optical fiber 16 at their end faces in the securing groove 60 of the fiber securing member 54 of the splicing section 18 of the optical connector 10. Further, the length L1 of the covered optical fiber 4 should be a length enabling the bending of the covered optical fiber 4 under a pressing force in the lengthwise direction between the splicing section 18 and the cable holding member 20 to be visually confirmed when setting the cable holding member 20 at the temporary position, while enabling the covered optical fiber 4 to be bent between the splicing section 18 and the cable holding member 20 by the allowable radius without receiving any pressing force or tension when setting the cable holding member 20 at the finished position.

In this way, in the optical connector 10 having the above configuration, at the time of the splicing operation of the optical fiber cable 1, by setting the cable holding member 20 at the temporary position, it is possible to maintain the covered optical fiber 4 of the optical fiber cable 1 in the state suitably bent under pressing force in the lengthwise direction inside the optical connector 10 (that is, between the splicing section 18 and the cable holding member 20). Further, by moving the fiber securing member 54 of the splicing section 18 in this state, it is possible to connect the incorporated optical fiber 16 and the optical fiber 5 of the optical fiber cable 1 in the state with their two end faces accurately abutting against each other. Therefore, there is no longer any need for using the conventional assembly tool having a fiber holding part and as a result the work efficiency of the splicing operation at the installation site of an optical transmission line is remarkably improved. Further, it is possible to bend the covered optical fiber 4 without directly touching the covered optical fiber 4 by just moving the cable holding member 20 to the temporary position, so the danger of more than the necessary tension being applied to the covered optical fiber 4 or the position of the optical fiber 5 inserted into the splicing section 18 deviating is eliminated. Therefore, according to the optical connector 10, the splicing operation of the optical fiber cable 1 can be performed accurately and stably without requiring skilled labor and a superior on-site installation property can be realized.

Further, with the optical connector 10, after finishing the splicing operation at the splicing section 18, the cable holding member 20 is moved to the finished position to substantially release the pressing force in the lengthwise direction applied to the covered optical fiber 4 of the optical fiber cable 1. Therefore, it is possible to sufficiently reduce the optical loss at the portion of the covered optical fiber 4 of the optical fiber cable 1 and possible to increase the lifetime at the portion of the covered optical fiber 4. Further, with the optical connector 10, since a one-piece cable holding member 20 is arranged at the cable holding part for holding the optical fiber cable 1 and the sheath 2 of the optical fiber cable 1 is inserted into the receptive groove 70, it is possible to reduce the number of parts and number of assembly steps compared with the prior art such as tightening a metal fitting. Further, since the connector is configured so that when the cable holding member 20 is at the finished position, the receptive groove 70 is arranged to extent in a direction intersecting the direction of extension of the incorporated optical fiber 16, the dimensions of the optical connector 10 finished being spliced in the direction of the main axis 12*a* of the body can be effectively slashed and therefore the optical connector 10 can be suitably used for a location with space restrictions.

Figure 18:
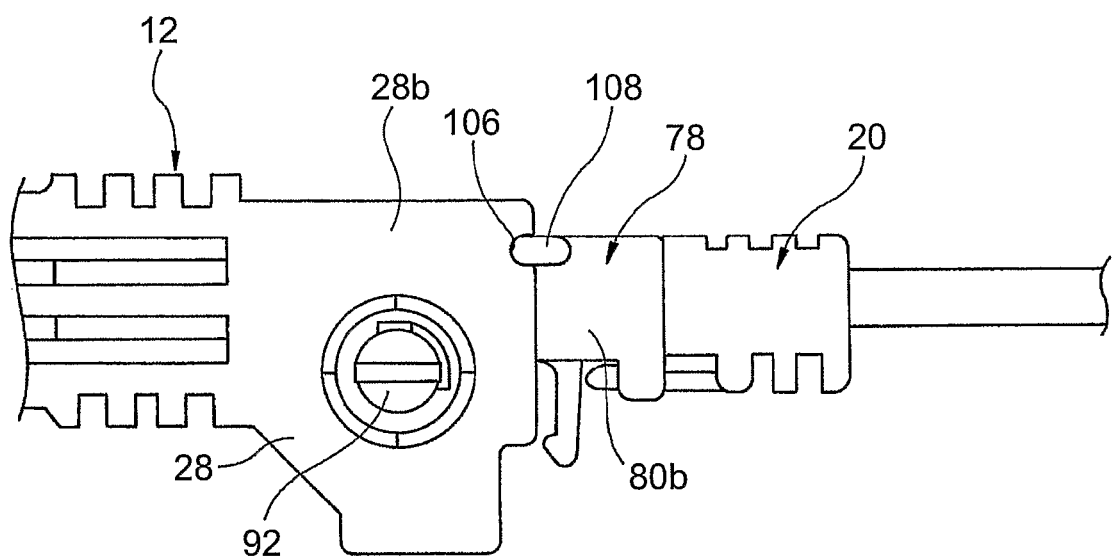
FIG. 18 is a view of an anchoring mechanism of a cable holding member showing the body and the cable holding member from the bottom side.

In the optical connector 10, it is advantageous to provide the body 12 with an anchoring structure for temporarily anchoring the cable holding member 20 at the temporary position. Such an anchoring structure, as shown in FIG. 18, may be comprised of a notch 106 locally provided at the outer edge of the bottom plate 28*b* of the rear portion 28 of the body 12 and a stopper 108 locally provided at the bottom 80*b* of the supporting portion 80 of the attaching member 78 and able to be inserted into the notch 106.

In this anchoring structure, by the stopper 108 of the attaching member 78 attaching the cable holding member 20 being inserted into and held by friction at the notch 106 of the rear portion 28 of the body 12, the cable holding member 20 is stopped at the temporary position. Therefore, in the above-mentioned splicing operation, after arranging the cable holding member 20 at the temporary position once, even if letting go of the cable holding member 20, the covered optical fiber 4 can be reliably maintained in the suitably bent condition, so the work of operating the actuating member 56 of the splicing section 18 becomes much easier. Note that this anchoring structure also acts to mechanically prevent the cable holding member 20 and the attaching member 78 from moving from the temporary position further in the direction away from the side plate 28*a* of the rear portion 28 of the body 12.

Figure 19A:
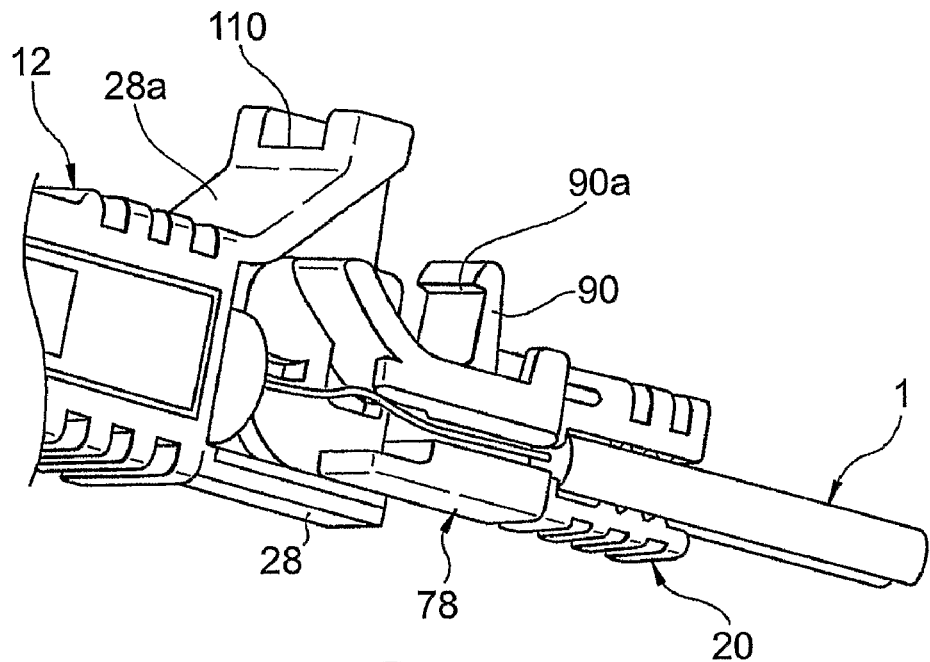
FIG. 19 shows views of another anchoring mechanism of a cable holding member, wherein (a) shows the temporary position and (b) the finished position.
Figure 19B:
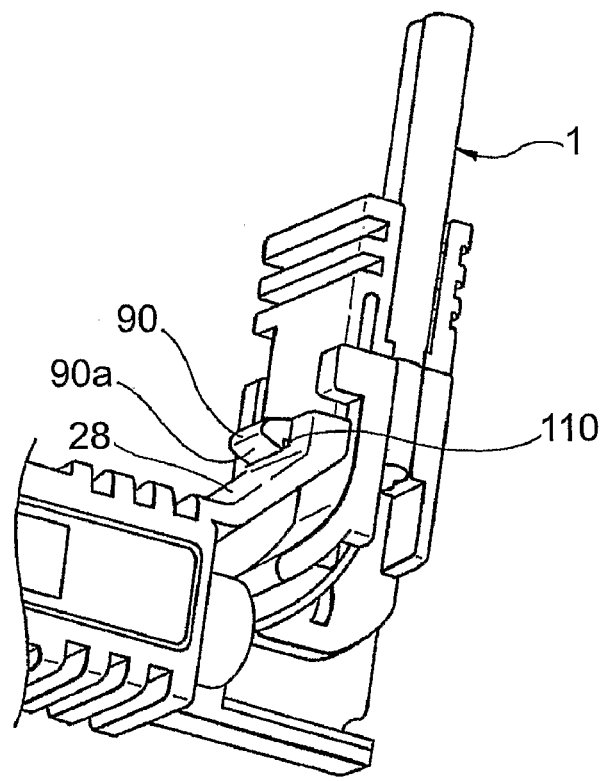

In the optical connector 10, it is further advantageous to provide the body 12 with an anchoring structure for anchoring the cable holding member 20 at the finished position. This anchoring structure, as shown in FIG. 19, can be comprised by an elastic arm 90 provided at the supporting portion 80 of the attaching member 78 and a counter edge 110 locally provided at the side plate 28*a* of the rear portion 28 of the body 12 (FIG. 19(*a*)). In this anchoring structure, the elastic arm 90 of the attaching member 78 attaching the cable holding member 20 engages snappingly with the counter edge 110 provided at the rear portion 28 of the body 12, whereby the cable holding member 20 is stopped at the finished position (FIG. 19(*b*)). Therefore, after the above splicing operation is completed and the cable holding member 20 is set at the finished position, even if tension or other external force is applied to the optical fiber cable 1, the cable holding member 20 is mechanically stopped stably at the finished position, so the danger of unintentional tension being applied to the covered optical fiber 4 or the cable holding member 20 unintentionally moving toward the temporary position is eliminated.

Figure 20:
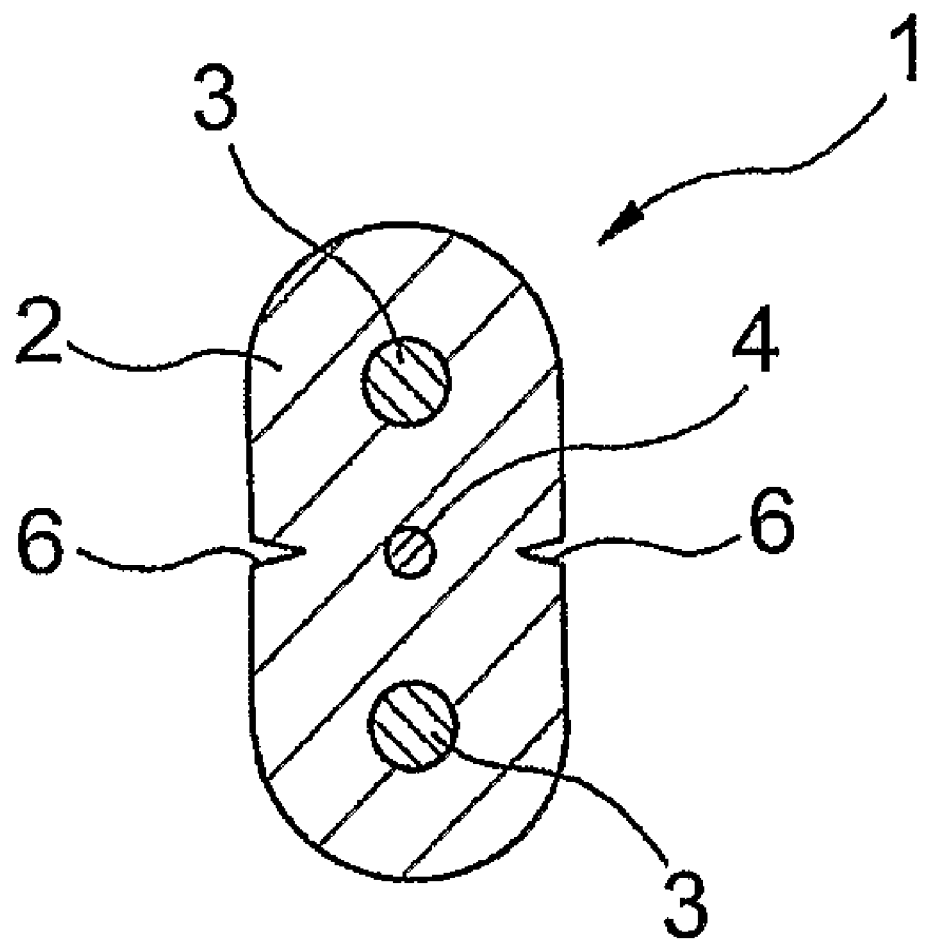
FIG. 20 is a cross-sectional view of a drop optical cable.

The optical connector 10 having this configuration can be suitably applied to an aerial access drop optical cable as the optical fiber cable 1 to be attached. As shown in FIG. 20, the drop optical cable 1 has a pair of channels 6 extending in the lengthwise direction at opposite positions on the outer surface of a plastic sheath 2 and is comprised of a covered optical fiber 4 arranged at a predetermined position (normally at the center position of the cable) with respect to the pair of grooves 6 and a pair of tension members (for example, steel wires, FRP (fiber reinforced plastic) cords, etc.) 3 arranged at the two sides of the covered optical fiber 4, which are housed in the sheath 2 with substantially no clearance therebetween.

In order to attach the optical connector 10 is attached to the drop optical cable 1 as illustrated, the sheath 2 is torn in a lengthwise direction along the channels 6 on the outer surface of the sheath to expose the covered optical fiber 4, the distal end of the optical fiber 5 is processed, and thereafter the splicing operation is performed in the predetermined procedure as described above, in the condition where the drop optical cable 1 is directly held by the cable holding member 20 together with the sheath 2 thereof. In the splicing operation, it is possible to suitably bend the covered optical fiber 4 of the drop optical cable 1 inside the optical connector 10 as already described, and thus it is possible to connect the incorporated optical fiber 16 of the optical connector 10 with the optical fiber 5 of the drop optical cable 1 (FIG. 10) in the condition where the end faces thereof are accurately abutted to each other, even when the sheath 2 of the drop optical cable 1 is held in the cable holding member 20.

Figure 21:
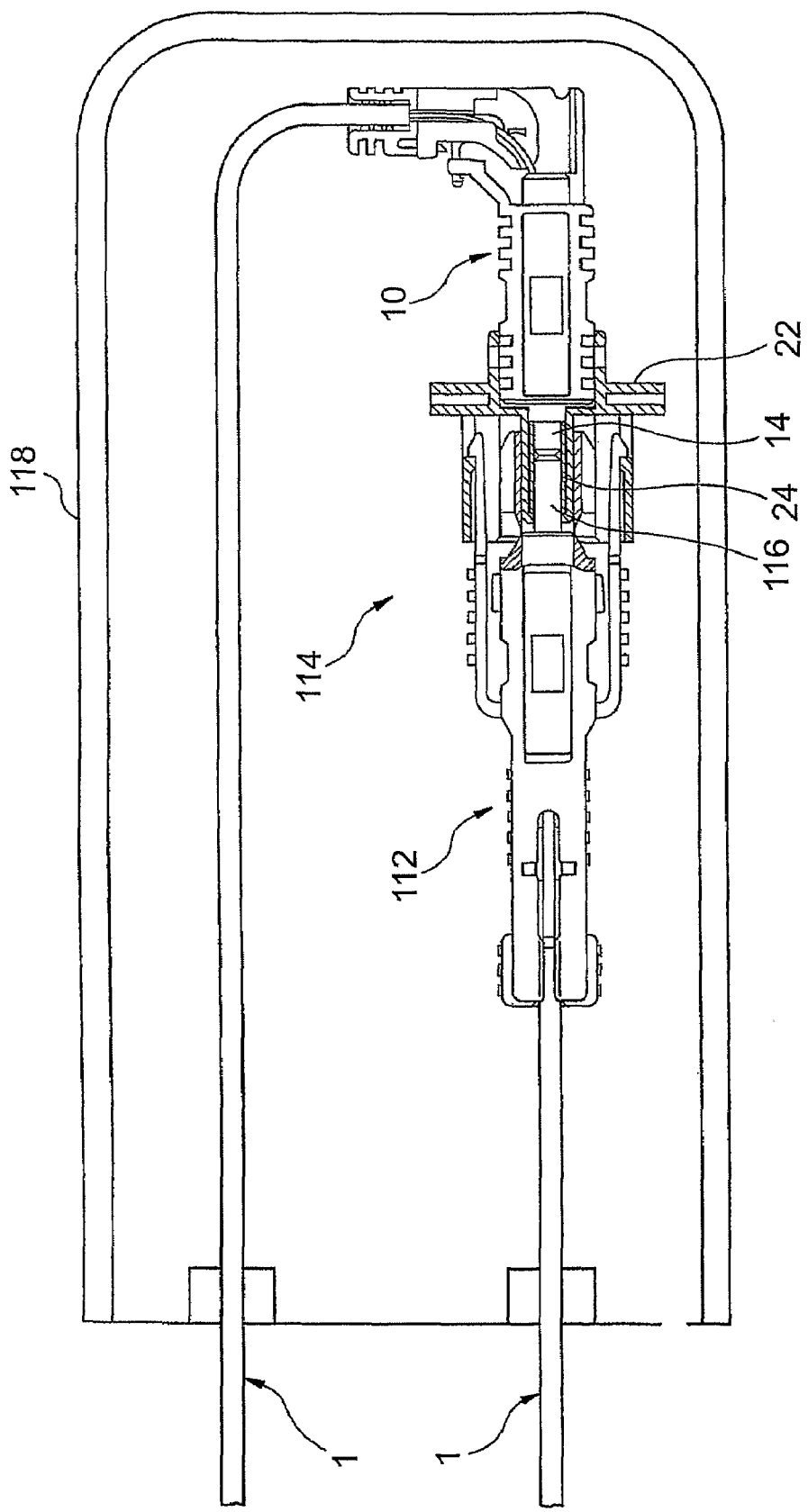
FIG. 21 is a plan view of an optical fiber connecting system according to an embodiment of the present invention.

The above optical connector 10 forms an optical fiber connecting system 114 when combined detachably with for example a straight type optical connector 112 as shown in FIG. 21. The counterpart optical connector 112 has a second ferrule 116 abutting concentrically against the ferrule 14 of the optical connector 10. When connecting the optical connector 10 and the optical connector 112, it is possible to use a well known split sleeve 24 in the adapter 22 attached to the body 12 of the optical connector 10 to make the abutting end faces of the ferrules 14, 116 of the connectors 10, 114 abut each other under the biasing force of for example a compression coil spring housed in the optical connector 112 and connect the pair of optical fibers in an end-abutting condition centered with a high precision. The optical fiber connecting system 114 having this configuration can be preferably applied to an optical transmission line laid in particular indoors due to the actions and effect of the optical connector 10. FIG. 21 shows as an example a cabinet 118 used in indoor wiring.

Above, preferred embodiments of the present invention were explained with reference to the figures, but the present invention is not limited to the illustrated configurations and can be modified in various ways within the description of the claims. For example, the configuration of the cable holding member of the optical connector according to the present invention can also be applied to an optical connector having a splicing section comprised of a pair of plates elastically held in close contact with each other which are pried apart to sandwich an optical fiber instead of the splicing section 18 of the illustrated embodiment. Further, the angle of intersection of the receptive groove of the cable holding member at the finished position with respect to the direction of extension of the incorporated optical fiber in the body can be set in various ways according to the configuration of the optical fiber cable to be attached. Further, the shapes and number of the engaging projections provided at the cable holding member may be modified in various ways to match the configuration of the optical fiber cable to be attached.

EXPLANATION OF REFERENCE NUMERALS

10 ... optical connector
12 ... body
14 ... ferrule
16 ... incorporated optical fiber
18 ... splicing section
20 ... cable holding member
22 ... adapter
26 ... front portion
28 ... rear portion
54 ... fiber securing member
56 ... actuating member
60 ... securing groove
70 ... receptive groove
74 ... engaging projection
78 ... attaching member
90 ... elastic arm
92 ... pivot shaft
94 ... fiber guide surface
106 ... notch
108 ... stopper
110 ... counter bore
114 ... optical fiber connecting system

We claim:

1. An optical connector, comprising a body; a ferrule provided in said body; an incorporated optical fiber with a predetermined length, securely supported on said ferrule; and a splicing section provided in said body near said ferrule and able to operate so as to securely support said incorporated optical fiber projecting out from said ferrule and an optical fiber of an optical fiber cable introduced from outside of said body in an end-abutting condition, characterized in that:

said optical connector further comprises a cable holding member provided in said body at a location opposite to said ferrule with said splicing section disposed therebetween, said cable holding member being able to hold an optical fiber cable; and in that said cable holding member is movable with respect to said body about an axis extending in a direction intersecting an extending direction of said incorporated optical fiber; said cable holding member being able to be set, in a state holding the optical fiber cable, at a temporary position where said cable holding member makes the optical fiber of the optical fiber cable abut against said incorporated optical fiber in said splicing section and bends a covered optical fiber of the optical fiber cable between said splicing section and said cable holding member under a lengthwise pressing force.

2. An optical connector as set forth in claim 1, further comprising an anchoring structure for temporarily anchoring said cable holding member at said temporary position on said body.

3. An optical connector as set forth in claim 1, wherein said cable holding member is able to be set at a finished position where, after said splicing section securely supports said incorporated optical fiber and said optical fiber of said optical fiber cable in said end-abutting condition, said lengthwise pressing force applied to said covered optical fiber of said optical fiber cable is released.

4. An optical connector as set forth in claim 3, further comprising an anchoring structure for anchoring said cable holding member at said finished position on said body.

5. An optical connector as set forth in claim 3, wherein said cable holding member is provided with a straight receptive groove for receiving the optical fiber cable, and is movable between said temporary position where said receptive groove extends in a direction substantially parallel to the extending direction of said incorporated optical fiber and said finished position where said receptive groove extends in a direction intersecting the extending direction of said incorporated optical fiber; and wherein said covered optical fiber of said optical fiber cable is bent between said splicing section and said receptive groove by a bending radius equal to or larger than a predetermined smallest bending radius when said cable holding member is located at said finished position.

6. An optical fiber connecting system, comprising a first optical connector as set forth in claim 1 and a second optical connector having a second ferrule to be concentrically abutted against said ferrule of said first optical connector; said first and second optical connectors being detachably combined with each other.

* * * * *